(12) United States Patent
Polichroniadis

(10) Patent No.: US 9,858,654 B2
(45) Date of Patent: Jan. 2, 2018

(54) IMAGE MANIPULATION

(71) Applicant: ANTHROPICS TECHNOLOGY LIMITED, London (GB)

(72) Inventor: Tony Polichroniadis, London (GB)

(73) Assignee: ANTHROPICS TECHNOLOGY LIMITED, London (GB)

( * ) Notice: Subject to any disclaimer, the term of this patent is extended or adjusted under 35 U.S.C. 154(b) by 0 days.

(21) Appl. No.: 14/909,352

(22) PCT Filed: Aug. 4, 2014

(86) PCT No.: PCT/GB2014/052390
§ 371 (c)(1),
(2) Date: Feb. 1, 2016

(87) PCT Pub. No.: WO2015/015231
PCT Pub. Date: Feb. 5, 2015

(65) Prior Publication Data
US 2016/0196641 A1 Jul. 7, 2016

(30) Foreign Application Priority Data
Aug. 2, 2013 (GB) .................................. 1313908.4

(51) Int. Cl.
*G06K 9/40* (2006.01)
*G06T 5/50* (2006.01)

(52) U.S. Cl.
CPC ...................... *G06T 5/50* (2013.01)

(58) Field of Classification Search
CPC ........... G06T 5/002; G06T 5/003; G06T 5/20; G06T 5/50; G06T 7/557; G06T 7/586;
(Continued)

(56) References Cited

U.S. PATENT DOCUMENTS 7,113,633 B2 * 9/2006 Petrich ...................... G06T 7/40
345/629
7,295,716 B1 * 11/2007 Chinen ................... G06T 5/009
345/77

(Continued)

FOREIGN PATENT DOCUMENTS

WO WO-00/68881 A2 11/2000
WO WO-2011/102850 A1 8/2011
WO WO-2012/006252 A1 1/2012

OTHER PUBLICATIONS

International Search Report issued in PCT/GB2014/052390 dated Dec. 12, 2014.
(Continued)

*Primary Examiner* — Jose Couso
(74) *Attorney, Agent, or Firm* — Marshall, Gerstein & Borun LLP

(57) ABSTRACT

A method of manipulating a two-dimensional digital input image using an image operator that represents a change in a lighting characteristic calculated based on a score offset indicating a desire to manipulate the lighting characteristic by a particular degree and a mapping derived from an association between characteristics of aligned two-dimensional digital images in a dataset and a score allocated to each of a plurality of the images in the dataset, each score representing a degree of the lighting characteristic in the image, wherein the image operator and the input image are aligned, the method comprising: receiving a request comprising a score offset indicating a desire to manipulate the lighting characteristic in the input image by a particular degree; applying a calculated image operator to the input image based upon the received offset to produce a manipulated image which corresponds to the input image but with the lighting characteristic manipulated.

20 Claims, 14 Drawing Sheets

(58) Field of Classification Search
CPC ..... G06T 11/001; G06T 15/50; G06T 15/506; G06T 2207/10024; G06T 2207/20024; G06T 2207/20192; G06T 2207/10152; G06K 7/10742; G06K 9/00832; G06K 9/2027; G06K 9/2036; G06K 9/4661; G06K 9/6214; G06K 2209/401; H04N 1/4092; H04N 1/58; H04N 1/6086; H04N 1/62; H04N 5/2354; H04N 5/2357; H04N 2201/3252; H04N 2201/3256; G03B 27/72; G03B 39/00
See application file for complete search history.

(56) References Cited

U.S. PATENT DOCUMENTS

| | | | | |
|---|---|---|---|---|
| 8,090,160 | B2* | 1/2012 | Kakadiaris | G06K 9/00208 345/419 |
| 8,228,560 | B2* | 7/2012 | Hooper | G06T 5/20 348/606 |
| 8,503,800 | B2* | 8/2013 | Blonk | G06K 9/00261 382/224 |
| 9,593,982 | B2* | 3/2017 | Rhoads | G01J 3/513 |
| 9,699,386 | B2* | 7/2017 | Kitajima | H04N 5/2354 |
| 2005/0212794 | A1* | 9/2005 | Furukawa | G06T 11/001 345/419 |
| 2009/0003723 | A1 | 1/2009 | Kokemohr | |
| 2011/0211758 | A1 | 9/2011 | Joshi et al. | |
| 2015/0312553 | A1* | 10/2015 | Ng | H04N 5/23203 348/47 |
| 2016/0042530 | A1* | 2/2016 | Imber | G06T 7/408 382/162 |
| 2016/0119526 | A1* | 4/2016 | Kitajima | H04N 5/2354 348/371 |
| 2017/0109931 | A1* | 4/2017 | Knorr | G06T 19/006 |
| 2017/0230584 | A1* | 8/2017 | Du | H04N 5/23293 |

OTHER PUBLICATIONS

Written Opinion issued in PCT/GB2014/052390 dated Dec. 12, 2014.

Combined Search and Examination Report issued in Great Britain Application No. GB1313908.4 dated Feb. 27, 2014.

Eisert P. et al., "Model-Based Enhancement of Lighting conditions in Image Sequences," *Visual Communications and Image Processings*, (Jan. 21, 2002).

Sang-Woong Lee et al., "Robust Face Recognition Across Lighting Variations Using Synthesized Exemplars," *Advances in Intelligent Computing: International Conference on Intelligent Computing, ICIC* (Jan. 1, 2005).

Malassiotis S. et al., "Robut Face Recognition Using 2D and 3D Data: Pose and Illumination Compensation," *Pattern Recognition* (Dec. 1, 2005).

Martin Fuchs et al., "Bayesian Relighting," *Proceedings of the 17th Eurographics Conference on Rendering Techniques* (Jun. 29, 2005).

\* cited by examiner

IMAGE MANIPULATION

CROSS-REFERENCE TO RELATED APPLICATIONS

This U.S. utility patent application is a national stage application under 35 U.S.C. §371 of international application PCT/GB2014/052390, filed Aug. 4, 2014, and claims the benefit of priority under 35 U.S.C. §119 of Great Britain Patent Application No. 1313908.4, filed Aug. 2, 2013, the entire contents of which are hereby incorporated herein by reference for all purposes.

TECHNOLOGICAL FIELD

The present invention relates to methods of manipulating the lighting and/or identity characteristics of images, particularly images of faces and/or bodies.

BACKGROUND

The manipulation of images, for example images which represent faces and or bodies of human subjects, for the purposes of general enhancement of images is known. For example, the processing of images to lessen the visibility of high frequency blemishes and marks is known as airbrushing.

Specific techniques for manipulating the surface properties of images of faces are computationally complex since the way in which skin reflects lighting is not well understood or is otherwise very complex and challenging to model or predict. Accordingly, it is particularly difficult to manipulate or modify the degree, direction, and/or contrast of the lighting in an image in a realistic manner.

Moreover, many techniques for manipulating images require a significant amount of user input and a considerable level of skill or technique to perform. Such manipulation may, for example, take the form of a user-controlled pointer tool which is displayed on the screen and which enables the user to manually manipulate small areas of the image. Such image manipulation methods are time-consuming and require considerable skill or training to perform.

The present invention seeks to provide an improved method of manipulating images in which the processing is performed in an automated manner. As such, the present invention seeks to reduce the amount of time and expertise required by the user in order to manipulate an image. In so doing, the present invention also enables the manipulation of lighting and/or identity characteristics of an image.

SUMMARY

According to an aspect of the invention, there is provided a method of manipulating a two-dimensional digital input image using an image operator that represents a change in a lighting characteristic, wherein the image operator is calculated based on a score offset indicative of a desire to manipulate the lighting characteristic in the input image by a particular degree and a mapping derived from an association between characteristics of aligned two-dimensional digital images in a dataset and at least one score allocated to each of a plurality of the images in the dataset, each score representing a degree of the lighting characteristic in the image, and wherein the image operator and the input image are aligned, the method comprising: receiving a request comprising a score offset indicative of a desire to manipulate the lighting characteristic in the input image by a particular degree; applying a calculated image operator to the input image based upon the received score offset to produce a manipulated input image which corresponds to the input image but with the lighting characteristic manipulated.

Optionally, the method uses an image operator that represents a change in an identity characteristic, wherein the image operator is calculated based on a score offset indicative of a desire to manipulate the identity characteristic of an input image by a particular degree and a mapping derived from an association between characteristics of the aligned two-dimensional digital images in a dataset and at least one score allocated to each of a plurality of the images in the dataset, each score representing a degree of the identity characteristic in the image, and wherein the image operator and the input image are aligned, the method optionally further comprising: receiving a request comprising a score offset indicative of a desire to manipulate the identity characteristic in the input image by a particular degree; applying a calculated image operator to the input image based upon the received score offset to produce a manipulated input image which corresponds to the input image but with the identity characteristic manipulated.

The dataset of two-dimensional digital images may comprise a plurality of images which are aligned with respect to one another. The dataset may be obtained separately. The dataset may be stored separately or remotely from the execution of the method. The dataset of images may comprise a plurality of images obtained from different sources or of different subjects. The dataset of images may be aligned and optionally weighted in a similar manner to that of the other aspects of the disclosure.

The scores may be allocated with the images of the dataset prior to execution of the above method or may take place during execution of the above method. The allocation of scores may be performed by a user during use or alternatively during configuration of the system. The allocation of scores may involve allocating one or more scores to at least one image in the dataset of images. The scores may be allocated to a subset of images of the dataset. Of the plurality of scores which are allocated to at least one image in the dataset of images, some images may be scored by a subset of the scores and other images may be scored by a different subset of the scores.

The allocation of a particular score to an image of the plurality of images in the dataset may comprise providing a subjective or considered assessment of the lighting and/or identity characteristics of that image. Each score category may represent a different lighting and/or identity characteristic of the image. An individual may therefore assess the image to allocate a score based upon the subjective value of that characteristic in the image in question. For example, lighting direction may be scored from a lower value to an upper value, wherein the lower value represents an image with a lighting source located to the left of the image whereas a higher value represents an image with a lighting source located to the right of the image. Other lighting and/or identity characteristics may include lighting contrast, or perceived beauty of the image. These characteristics may be scored so that high values recognise a high degree of a particular characteristic whilst a low value may recognise a low degree of a particular characteristic. Other scoring schemes are possible, as will be recognised by the skilled person.

The alignment process and the weighting process may be performed in accordance with the same processes described in respect of other aspects of the disclosure.

Each perceived characteristic to be scored may directly relate to lighting and/or identity characteristics of the input image or may be considered at a higher level. Since the perceived characteristics of an image are pre-defined, it is possible to control what the perceived characteristics to be scored refer to. For example, the user may wish to configure the system to use a perceived characteristic of beauty, sculptural-ness, cheek definition which may be considered subjective and abstract concepts. The relationship between these characteristics and tangible characteristics of images is hard to understand. In contrast, the perceived characteristics to be scored may include such aspects as lighting contrast and lighting direction which are more closely related to actual, tangible characteristics of images. As such, the perceived characteristics to be scored may have a one-to-one relationship with lighting and/or identity characteristic. Alternatively, the perceived characteristics of images may each represent a plurality of lighting and/or identity characteristics of images.

The request may be made by a user of the method or may alternatively be an automated request made by a device or another process which requires the manipulated input image. As such, the request may be received by user input or alternatively may be received through a particular communication mechanism. The request is typically indicative of a desire to manipulate the lighting and/or identity characteristics of the input image by a particular degree. For example, the request may be in the form of a single desired manipulation of a single lighting and/or identity characteristic of the input image. Alternatively, the request may comprise a number of different desired manipulations of a number of different lighting and/or identity characteristics of an input image.

Optionally, the request to manipulate the lighting and/or identity characteristics of the input image is represented by a score offset and wherein the image operator is calculated based on a mapping and the score offset, and wherein the mapping is derived from a dataset of aligned two-dimensional digital images and at least one score allocated to each of a plurality of the images in the dataset.

The request to manipulate the lighting and/or identity characteristics may represent a score offset. Since the scores allocated to images in the dataset represent the lighting and/or identity characteristics of the image, the score offset may represent an adjustment or change in the lighting and/or identity characteristics that may be desired by a user. For example, a score may represent lighting contrast. In this example, the score offset may represent a request to increase the lighting contrast by a specified amount. It is therefore possible to use the mapping between the scores and the dataset of images in order to produce a manipulated input image which represents the input image but with the manipulated lighting and/or identity characteristics that relate to the score offset. In the above example, the manipulated input image has increased lighting contrast because the score offset represented such an increase.

By utilising scores associated with the images in the dataset it is possible to obtain a relationship between lighting and/or identity characteristics of a set of images it is possible to use subjective assessment of images, such as faces, to determine what characteristics of an image are associated with such a subject change and to apply those characteristics to the input image. Advantageously, it is not necessary to model or render the images, nor is it necessary to perform complex data processing techniques upon the images in order to manipulate the input image.

Optionally, the calculating of the image operator comprises; determining a mean of the dataset; determining an adjusted mean of the dataset using the mapping and the score offset, and determining a pixel-wise change between the mean of the dataset and the adjusted mean of the dataset to generate the image operator representing the requested manipulation of the lighting and/or identity characteristics.

Optionally, determining the pixel-wise change comprises at least one of pixel-wise subtraction and pixel-wise division. Optionally, applying the image operator to the input image comprises at least one of pixel-wise addition and pixel-wise multiplication.

Optionally, the method further comprising: deriving a distribution of model parameters from the dataset of images, wherein the distribution of model parameters represent commonalities of lighting and/or identity characteristics of the dataset; converting the input image into model parameters; applying the image operator to the input image by applying the score offset to the model parameters of the input image based on the mapping to adjust the model parameters of the input image; and generating the manipulated input image based on the adjusted model parameters of the input image.

The distribution of model parameters may be obtained prior to execution of the methods of the present disclosure. The distribution of model parameters may be provided for use without the original dataset of images of which the model parameters are representative. Alternatively, the model parameters may be generated during execution of the disclosed methods. However, this approach may be less desirable due to increased processing requirements during its execution.

The distribution of model parameters is generated based upon a dataset of images, where the images are representative of typical images within the specific application. For example, the dataset of images may be images of faces and/or bodies of human subjects. By parameterising the dataset and generating a distribution of model parameters, the model parameters represent a distribution of which elements, features, or aspects of the dataset of images are common to the images in the dataset and which are uncommon to the images in the dataset.

By generating a distribution of model parameters, it is possible to use the understanding of the common elements of the dataset of images in order to produce a manipulated input image which retains those common elements. In this way, where the images are of humans, it is the lighting and/or identity characteristics and skin textures of the dataset which are represented in the model parameters. Since the images are aligned with respect to one another, and may optionally be weighted, as described previously, it is possible to directly model such characteristics of images and ignore the superfluous, context-specific, information such as hair-type, colour and location or setting of the image. Accordingly, it is possible to place focus upon the relevant changes in the face and/or body of the human subject.

The distribution of model parameters describes the common aspects of the dataset of images. Put another way, generating the distribution of model parameters extract specific data from the large amount of data within the dataset of images so that the distribution of model parameters is representative of the common lighting and/or identity characteristics of the dataset.

The distribution of model parameters of the dataset of images can be considered to provide a representation of the common or similar elements of the images in the dataset whilst removing or disregarding any uncommon features of particular images within the dataset. Thus, the distribution of model parameters seeks to understand and evaluate commonalities in the data of the dataset. This may be done by understanding the correlations between the data in the dataset.

The method may optionally comprise generating the model parameters. The method may comprise generating the model parameters prior to processing an input image. The method may comprise generating the model parameters each time an input image is due to be processed. The method may comprise simply accessing model parameters which are pre-generated prior to the processing of the method. The generation of the model parameters may be done separately to the processing of the method.

The model parameters may be considered to represent a data model of the dataset. The data model may be formed so as to enable the generation of new images. In this way, the data model may be considered to be a generative model. For example, the model may be considered to be a generative model. The generative model generates a new image based upon the model parameters and an input image.

Optionally, the distribution is based upon a weighted sum of the dataset of images. Optionally, the distribution is based upon a pixel-wise weighted sum of the dataset of images. In the example of a weighted sum of the data set of images, the model parameters are a vector of numbers, wherein each number represents the weight or contribution of each of the input images. The weights of each image are mapped to an output image by computing the weighted sum of the RGB components at each pixel. The model parameters are therefore a large vector of numbers. Each image has a set of numbers corresponding to the contribution of that image for each RGB pixel in the image.

Principal component analysis (PCA) may be used to generate the distribution of model parameters. Independent component analysis (ICA) or clustering may be used. As will be appreciated by the skilled person, any technique which is able to extract common features or elements of a dataset may be used. For example, where the image represents a face, the use of techniques such as PCA on the weighted, aligned faces produces a model of face variation within the face skin area.

The conversion of the input image into model parameters is performed to generate an approximation of the input image which conforms to the model parameters. Put another way, the conversion of the input image into model parameters establishes a nearest-fit representation of the input image in terms of the model parameters of the dataset. This process is also known in the art as "estimating hidden variables".

By converting the input image into model parameters, the input image is represented in terms of model parameters. Put another way, a representation of the input image is produced which conforms to the model parameters of the dataset, i.e. falls within what can be modelled by data in the dataset of images and is also a closest approximation of the input image.

Optionally, at least one score is user-defined. Optionally, at least one score comprises at least one of: the direction of the lighting of the image and the lighting contrast of the image. Optionally, the degree to which each lighting or identity characteristic of the input image is manipulated is limited based upon the standard deviation of model parameters in the dataset.

The limitation of the change in characteristic may be performed by clamping within specific boundaries. The clamping may occur based upon the standard deviation of the model parameters in the dataset. For example, where PCA is used the clamping may be based upon the variance of data in the dataset.

Optionally, the image operator may be represented as an operator control image and wherein the method may further comprise manually editing the operator control image. Advantageously, this gives even more precise control over the adjustment of lighting or identity characteristics, while keeping the subtleties gained from basing the image operator on real images.

Optionally, each of a plurality of images in the dataset has more than one score, wherein the score offset may comprise an offset to more than one score, and the method may further comprise applying the effect of each offset so that the effect of each offset is orthogonal to the effects of other offsets.

According to another aspect of the invention, there is provided a method of manipulating lighting characteristics of a two-dimensional digital input image using a distribution of model parameters derived from a dataset of aligned two dimensional digital images, wherein the model parameters comprise model parameters that represent commonalities of lighting characteristics in the dataset, the method comprising: receiving an input image, wherein the input image is aligned to the dataset of images; converting the input image into model parameters to remove the uncommon lighting characteristics of the dataset in the input image; modifying the model parameters of the input image by scaling the model parameters to reduce the distance to the distribution of model parameters; using the modified model parameters of the input image to produce a modified input image which corresponds to the input image but with manipulated lighting characteristics.

Optionally, wherein the model parameters also comprise model parameters that represent commonalities of identity characteristics in the dataset; converting the input image into model parameters also removes uncommon identity characteristics of the dataset in the input image; and the modified input image corresponds to the input image but with manipulated lighting and identity characteristics.

The process of alignment of images, the generation of a distribution of model parameters, the conversion of the input image into model parameters, and the scaling of this aspect may be performed in substantially the same manner as other aspects of this disclosure.

Optionally, the distribution is represented by a plurality of modes and a mean; each mode may represent variances in the lighting and/or identity characteristics of the dataset of images; and the mean may be representative of the mean image of the dataset.

Optionally, the distribution is based upon a weighted sum of the dataset of images. Optionally, the distribution is based upon a pixel-wise weighted sum of the dataset of images. Optionally, the distribution is generated by performing principal component analysis "PCA".

Where PCA is used, the model parameters are represented by a plurality of modes and a mean value of the dataset. For example, in PCA, the first few modes which are generated by PCA represent the largest variances in the data of the dataset whilst the latter modes represent smaller variances. As such, where the images are faces, the latter modes typically encode uncommon or unusual aspects of the images, for example uniquely positioned or rarely present blemishes, birth marks or spots of the images. Conversely, the earlier modes typically represent common variances in the data set. For example, the first mode typically represents something similar to ethnicity. The earlier modes typically also encode such characteristics such as significant lighting changes across the image.

The number of modes used in representing the model parameters may be significantly lower than the number of dimensions which are inherent within the data. For example, the number of modes which are generated by PCA may be less than the number of RGB values of pixels which represent each image in the dataset. For example, the number of modes may be less than 50. The images in the dataset may be representative of a person's face and, in this example, the mean value of the model parameters may look like an average face. Using a reduced number of modes advantageously reduces the amount of processing required. However, by using fewer modes, less information about the dataset is retained. In the present disclosure, it is beneficial to use a reduced number of modes since it is desirable to be able to discard information which is uncommon to the dataset and retain only the information which is common.

The number of modes, in, will be significantly less than the number of RGB values of pixels in the image. As will be appreciated, the value in will determine the degree to which uncommon aspects of the dataset are represented by the PCA parameters. For example, a higher value of in will result in a larger amount of uncommon features being modelled as part of the PCA analysis.

The use of PCA may be considered to reduce the dimensionality of the data within the dataset of images.

Optionally, the scaling comprises scaling the model parameters of the input image towards the mean. The mean may be the mean value of the distribution of model parameters.

Optionally, scaling the model parameters of the input image is performed by an amount related to their respective mode. Optionally, the degree of scaling is controllable by user input.

According to another aspect of the invention, there is provided a method of manipulating at least one of lighting and identity characteristics of a two-dimensional digital input image using a distribution of model parameters derived from a dataset of two dimensional digital aligned images, wherein the distribution of model parameters comprise model parameters that represent commonalities of, lighting and/or identity characteristics in of the dataset, the method comprising: receiving an input image, wherein the input image is aligned to the dataset of images; converting the input image into model parameters to remove uncommon lighting and/or identity characteristics of the dataset in the input image; and using the model parameters of the input image to produce a modified input image which corresponds to the input image but with manipulated lighting and/or identity characteristics.

Optionally, wherein the model parameters also comprise model parameters that represent commonalities of identity characteristics in the dataset; converting the input image into model parameters also removes uncommon identity characteristics of the dataset in the input image; and the modified input image corresponds to the input image but with manipulated lighting and identity characteristics.

The conversion of the input image into model parameters may be performed in substantially the same manner as the previous aspects.

The above method describes that an input image is converted into model parameters of a distribution of model parameters which represent commonalities of lighting and/ or identity characteristics of the dataset. Beneficially, uncommon lighting and/or identity characteristics of the input image are not retained during the conversion which means that the produced modified input image does not retain the uncommon lighting and/or identity characteristics of the input image.

Optionally, the method further comprises scaling the model parameters of the input image to reduce the distance to the distribution of model parameters; and using the scaled modified model parameters of the input image to produce the modified input image.

Optionally, the method further comprises: generating a residual difference between the modified input image and the input image; applying blurring to the residual difference to generate a blurred residual image; and adding the blurred residual image to the modified input image to generate an airbrushed image. Advantageously, this method of airbrushing produces better quality results than standard techniques as it is better able to differentiate between high frequency features that are faults such as age related wrinkles, and high frequency features that are desirable such as smile wrinkles.

Optionally, the method further comprises blending the input image with the airbrushed image, wherein the degree to which the input image is blended with the airbrushed image is based upon the contrast between the input image and the airbrushed image.

Optionally, for each pixel of the input image, the value of the pixel in the input image is blended with the value of the corresponding pixel of the airbrushed image; and the degree to which the value of each pixel of the input image is blended with the airbrushed image is reduced where the contrast between corresponding pixel values of the input image and the airbrushed is greater than a threshold value.

Blurring may be performed using one of a number of different blurring techniques, for example Gaussian blurring, linear blurring, block blurring, or other techniques involving convolution.

Optionally the method further comprises: combining the airbrushed image and the input image to generate an output image by applying a first multiplier "A" to the smoothed image and applying a second multiplier "B" to the input image, wherein A+B=1. Optionally, the first multiplier "A" and the second multiplier "B" are controllable by user input.

Optionally, generating the output image based on the adjusted representation of the input image comprises: scaling said the model parameters of the input image to reduce the distance to the distribution of model parameters; using the scaled modified model parameters of the input image to produce a second modified input image; generating an image operator representing a change in at least one of lighting and/or identity characteristics between the second modified input image and the airbrushed image; and applying the image operator to the output image.

Where the distribution of model parameters is generated by PCA, the model parameters of the dataset of images comprise modes and a mean. In this example, the number of modes may be less than the number of total RGB values of the dataset of images. Accordingly, some information about the input image may be lost when the input image is converted into model parameters. Each mode represents a common characteristic between the images in the dataset. By discarding the later modes, the less common characteristics of the images in the dataset are accordingly discarded, or disregarded. Since the earlier modes represent the largest variances in the dataset, the resultant manipulated input image in terms of model parameters does not retain all information. Rather, the more common characteristics of the input image, represented by the higher order modes, are retained and the less common aspects are not retained.

As such, the resultant conversion of the input image into model parameters may be considered "lossy" since it is not possible to return to the original input image from the representation of the input image in terms of model parameters.

Optionally, at least one image represents at least one of a face and a body of a human. The images may be images of the same subject type. For example, the images may be images of humans. The images may be of human faces and or human bodies or a combination thereof.

Optionally, at least one image undergoes an alignment process to ensure alignment. Optionally, the alignment process comprises aligning the image to a reference shape.

The images may be obtained under conditions in which the images are aligned with respect to one another. For example, the images may be obtained using a photo-booth in which the images at the same orientation and position so that the size and direction of the subject, such as a face, are identical in each image. However, even under these conditions there may be some issues that arise due to imprecise alignment or variations in alignment which can negatively affect the manipulated input image. At least one of the input image, the first image, the second image, or at least one image in the dataset of images may undergo an alignment process in order to ensure that the images are aligned with respect to one another, as described earlier.

Optionally, the method further comprises performing a reversed alignment process to remove the effects of the alignment process. Optionally, the alignment process comprises warping the at least one image. Optionally, at least one image is weighted according to a weighting mask.

The images that are placed in the dataset of images may be selected so that the images have particular characteristics. For example, the images may be selected to be evenly illuminated, attractively illuminated, or comprise images with other desirable properties or characteristics. Similarly, where the images in the dataset are of faces and/or bodies, the images may be selected to have well illuminated faces or bodies, or may be selected so that the faces are particularly attractive. However, this is not necessary in order for the disclosed methods to operate correctly. Indeed, it may be desirable in some applications that the images are varied in the quality of their lighting and/or identity characteristics.

According to another aspect of the invention, there is provided a computer-readable medium comprising machine instructions which, when executed by a processor, cause the processor to perform one or more of the above methods.

According to another aspect of the invention there is provided a device configured to perform one or more of the above methods.

The methods may be processor-implemented or computer-implemented methods. The methods may be stored as machine instructions which, when executed, perform the above methods. A system or computer such as a general-purpose computer which is configured or adapted to perform the described methods is also disclosed.

Other aspects and features of the present invention will be appreciated from the following description and the accompanying claims.

BRIEF DESCRIPTION OF THE DRAWINGS

Embodiments of the present invention will now be described, by way of example only, with reference to the accompanying drawings in which like reference numerals are used to depict like parts. In the drawings.

DETAILED DESCRIPTION

Embodiments of the present invention relate to methods of manipulating images.

Figure 1:
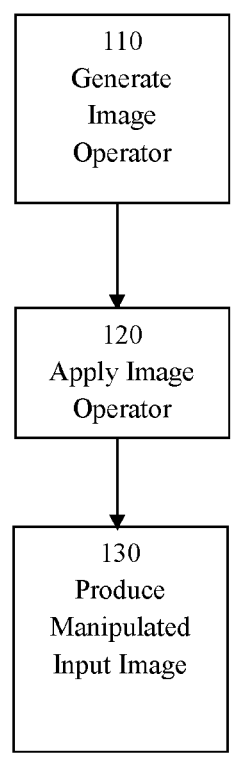
FIG. 1 illustrates a flow diagram of a an image manipulation method.

According to a first embodiment, a method of manipulating an input image is illustrated in FIG. 1. The method utilises a first image and a second image in order to generate an image operator at step 110. In this illustrative described embodiment, the first image and the second image are of the same subject, i.e. the same human's face and/or body. The first image and the second image differ in that they exhibit different lighting and/or identity characteristics. For example, the first image is taken of a subject under a first set of lighting conditions and the second image is taken of the same subject under a second set of lighting conditions and the first and second lighting conditions are not the same. In this way, it is possible control the effect that the image operator is configured to have upon the input image The first image and the second image are aligned with respect to one other. In this illustrative embodiment, the images are aligned by warping both the first image and the second image to a reference shape, as described later. The unaligned first and second images need not be of the same dimensions. The first image and the second image are also weighted by a weighting mask.

The image operator is generated based upon the change between the first image and the second image, the change being representative of the difference in lighting and/or identity characteristics. This is done by controlling the characteristics of the first image and the second image so that they exhibit the differing characteristics that the user would wish to manipulate in the input image. In the first illustrative embodiment, the change between the first and second image is provided by generating a ratio image of the first and second image using the following calculation:

$$\text{image operator} = \frac{\text{first image}}{\text{second image}}.$$

Having generated the image operator at step 110, it is possible to apply the image operator to an input image at step 120. The input image is manipulated by applying the image operator to the input image to produce a manipulated input image using the following calculation:

manipulated input image=input image*image operator.

In this illustrative embodiment, the difference between the first image and the second image is that the first image has a different overall lighting direction than the second. Therefore, the image operator is configured to represent a change in lighting direction. Accordingly, application of the image operator to the input image produces a manipulated input image but with a change in lighting direction as represented by the difference between the first and second images.

The alignment and weighting process are then reversed in order to return the manipulated input image to the previous orientation and location but with the manipulated lighting and/or identity characteristics. Alternatively the image operator can be aligned to the input image to retain the detail in the input image.

The above calculations may be performed as pixel-wise calculations which, advantageously, do not require any complex rendering or modelling calculations.

The calculation of the image operator may comprise addition, subtraction, or other pixel-wise operators. As such, it is not necessary that the image operator is a ratio image. Similarly, the application of the image operator to the input image may comprise division, subtraction, or other pixel-wise operators.

The first and second images may be inherently aligned and of the same resolution. In some embodiments, the input image, the first image, and the second image may all undergo an alignment process to ensure that the images are aligned to one another. In some embodiments, the first image and the second image may be aligned to a reference shape.

In some embodiments, the first image and the second image may be images of the same subject. In other embodiments, the first image and the second image may be of different subjects. In other embodiments, the input image, the first image, and the second image may be images of humans, for example images of human faces and/or bodies.

In some embodiments, the first image, the second image and/or the input image may optionally be weighted by a weighting mask which emphasizes some aspects of the image and de-emphasizes other aspects of the image.

In some embodiments, the first image and the second image are obtained under a controlled environment. In other embodiments, the first image and the second image may be obtained in different environments and simply exhibit different lighting conditions.

Manipulating an Image Using a Dataset of Images

The above described embodiment of manipulating an input image applies an image operator that is representative of a change in lighting and/or identity characteristics of an image to an input image. In the above described embodiment, the image operator is based upon a difference between a first image and a second image. This principle of using differences in images to manipulate an input image of the above-described embodiment may be expanded to utilise a larger number of images, i.e. a dataset of images.

Figure 2:
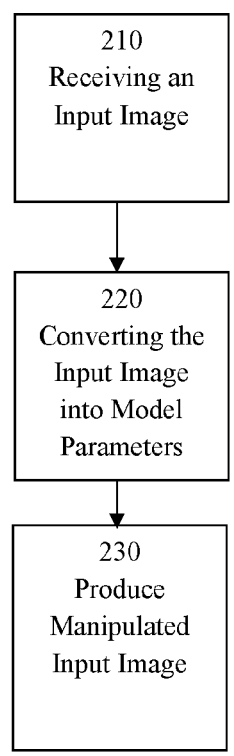
FIG. 2 illustrates a flow diagram of another image manipulation method.

In order to manipulate an input image using a dataset of images, the following embodiment is described below and is illustrated in FIG. 2, and which utilises a distribution of model parameters of the dataset of images. As shown in FIG. 2, the input image is converted into model parameters at step 220 and a manipulated input image is generated at step 230.

Figure 3:
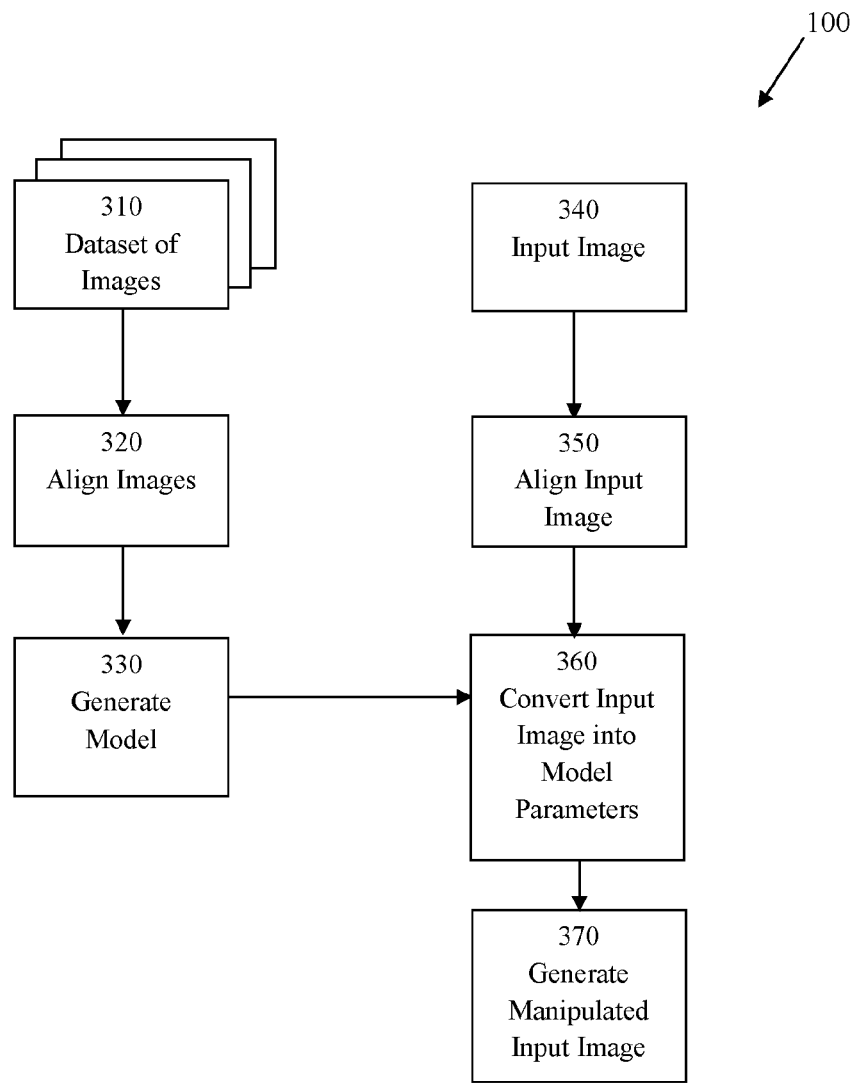
FIG. 3 depicts a flow diagram of another image manipulation method.

The use of the dataset of images in this embodiment is described in more detail below. An illustrative method 300 comprises manipulating an input image 340 based upon an aligned dataset of digital two-dimensional images 310 as shown in FIG. 3. An illustrative process of generating a distribution of model parameters of the dataset of aligned images, 330, is also described below.

FIG. 3 illustrates a flow diagram of manipulating an input image in which a set of digital two-dimensional images of faces are obtained at step 310. The images obtained at step 310 undergo an alignment process at step 320 in order to align the images in the dataset with respect to one another through a process of warping the images which uses triangular meshes. After the alignment step 320, each image in the dataset also undergoes a weighting process by applying a weighting mask to the image.

Figure 4A:
FIG. 4a illustrates a reference shape for a face.
Figure 4B:
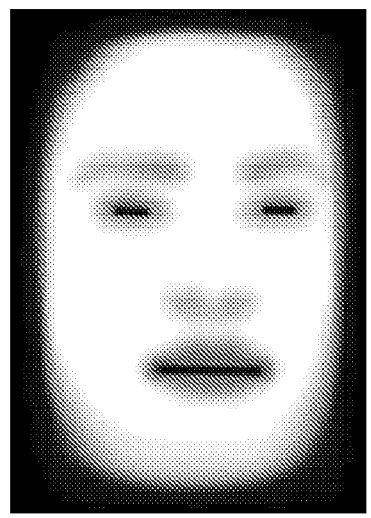
FIG. 4b illustrates a weighting mask for a face.

The image alignment and weighting process 310 of FIG. 3 is illustrated in further detail in FIGS. 4a and 4b, where the image to be aligned is representative of a person's face. The images 310 (faces) are aligned by warping them all into a fixed shape called a "reference shape" 400 which is represented by the grid structure in FIG. 4a. Features of the image are detected and warped by processing the image so as to ensure that each image in the dataset is aligned with one another. The eye, mouth, and nose location may be warped to correspond with specified points in the grid.

By aligning to a reference shape 400, the face area fills the same proportion or area of the aligned image. By performing this alignment for each of the images within a dataset of images 310, any differences in images due to their orientation or position within the frame of the image are removed when processing the images 310 during the model generation step 330.

FIG. 4b shows an illustrative weighting mask which is applied to each aligned image as part of the image alignment process 320 in order to emphasize or de-emphasize particular elements of the aligned image. For example, the darker portions of the weighting mask illustrate the areas which are de-emphasised. The weighting mask is configured so that the detail in the black areas of the mask are completely ignored, i.e. outside of the face area in addition to the centre of the eyes and in the inside of the mouth. The weighting mask is also configured so that grey areas of the weighting mask are de-emphasized. Put another way, less emphasis is placed upon the grey areas of the weighting mask areas of the image when compared with the corresponding white areas so that the darker the area of the weighting mask, the more that area is ignored or de-emphasized. For example, the areas surrounding the eyes and the periphery of the face are de-emphasized by the weighting mask. In this embodiment, the image is of a face, and the weighting mask de-emphasises areas of the image which are not skin surfaces and emphasises areas of the face such as cheeks.

The aligned images of the dataset of images obtained at step 320 are then input into the distribution of model parameters generation step 330 in order to generate a distribution of model parameters of the dataset of images.

An illustrative process used to generate the distribution of model parameters at 330 is Principal Component Analysis (PCA), in which a plurality of modes and a mean image is generated and which form the model parameters 335 of the dataset. In this embodiment, the model parameters are a set of PCA parameters. The model parameters 335 of the dataset of two dimensional images are determined by PCA and are represented by the matrices illustrated below:

$$M = \begin{pmatrix} a_{1,1} & \cdots & a_{1,m} \\ \vdots & \ddots & \vdots \\ a_{v,1} & \cdots & a_{v,m} \end{pmatrix}$$

$$\text{Mean} = \begin{pmatrix} b_1 \\ \vdots \\ b_v \end{pmatrix}$$

Wherein m=total number of modes, v=total number of RGB number values, where each pixel in the image has a Red value, a Green value, and a Blue value.

The modes matrix M represents the modes of the data set of images and the mean vector represents the mean image of the distribution of model parameters of the data set of images. The aligned input image is represented as a number of values, I, which each represent an R, G, or B value for a particular pixel of the p pixels in the input image and the total number of RGB values v of the input image is determined by Equation 1:

$$v = (p*3) \qquad \text{Equation 1}$$

In the present illustrative embodiment, where the input image has a resolution of 200×100 pixels, v=60000. In this embodiment, the number of modes selected for use in PCA, m, is 40. The resultant modes matrix M has dimensions [60000,40]. It will be appreciated by the skilled person that these selected values are arbitrarily selected and other image resolutions and mode numbers may be employed.

Converting the Input Image into Model Parameters

In the embodiment of FIG. 3, the method of manipulating an image 300 of FIG. 3 comprises a process of converting the input image into model parameters at step 360.

The distribution 330 of model parameters generated by PCA may be considered as a generative model 330, wherein the model 330 is representative of a dataset 310 and is configured to generate a manipulated input image 370 based upon the aligned input image 340.

At step 360, the aligned input image 340 is converted into model (e.g. PCA) parameters. The PCA parameters 335 are represented as the modes and the mean value. In order to generate the PCA parameters of the input image the following Equation is used:

$$\text{Model Parameters of Input Image} = (\text{Aligned Input Image} - \text{Mean}) * M^{-1} \qquad \text{Equation 2}$$

wherein the aligned input image is represented as a vector in the form of $$\begin{pmatrix} I_1 \\ I_2 \\ I_3 \\ \vdots \\ I_v \end{pmatrix};$$

By converting the aligned input image into PCA parameters, uncommon lighting and/or identity characteristics of the dataset of input images are not retained. Put another way, the process is "lossy" in that it is not possible to return to the original input image from the PCA parameters of the input image.

The model parameters of the input image obtained at step 360 of FIG. 3 therefore represents the aligned input image with a set of model parameters at an effective reduced fidelity. It is then possible to use the model parameters of the input image to generate a manipulated input image which corresponds to the input image but with manipulated lighting and/or identity characteristics.

An illustrative calculation by which the manipulated input image is generated at step 370, as illustrated in Equation 3, which shows that the model parameters (the PCA parameters) of the input image are multiplied by the modes matrix and the mean image is then added to the result.

Manipulated Input Image=(Parameters of Input Image×M)+Mean  Equation 3

The manipulated input image in which the uncommon lighting and/or identity characteristics of the input image are ignored and are not present in the manipulated input image produced at step 370.

It will be appreciated by the skilled person that it is not necessary for each image to undergo an alignment process at step 320 in order to align the images with respect to one another. In some embodiments, the images may be inherently aligned due to the nature of the images as they are obtained.

The alignment process may take a number of different forms. For example, although the above embodiment describes warping using triangular meshes, the skilled person will appreciate that there are a number of alternative mechanisms by which the alignment of images may be performed. This can be achieved by any mapping in which pixels are moved in the image resulting in features ending up at specified places. In some embodiments, it may only be necessary for some of the images to be aligned.

In some embodiments, during the alignment step each image in the dataset may optionally undergo a weighting process by applying a weighting mask to the image in substantially the same manner as described in respect of the previous embodiment.

Although the above embodiment describes an arrangement where the image is an image of a face, it will be appreciated by the skilled person that this is not necessary and that images of other subjects may also be used. For example, in some embodiments, images of bodies, combinations of faces and bodies, or inanimate objects may be manipulated.

The above-described embodiment refers to the use of PCA to generate the distribution of model parameters. However, it will be appreciated by the skilled person that other processing techniques may be employed instead of PCA in order to generate the distribution of model parameters In some embodiments, such techniques may include a weighted sum of the dataset of images, a pixel-wise weighted sum of the input images, Independent component analysis (ICA), or clustering. As a result, the model parameters may not necessarily be PCA parameters and will be determined according to the particular processing technique that is employed.

It will therefore be appreciated that the above calculations will accordingly differ according to the processing technique employed to generate the distribution of model parameters. The modification of the above calculations for use with a particular processing technique is entirely within the capability of the skilled person.

Airbrushing

Figure 5:
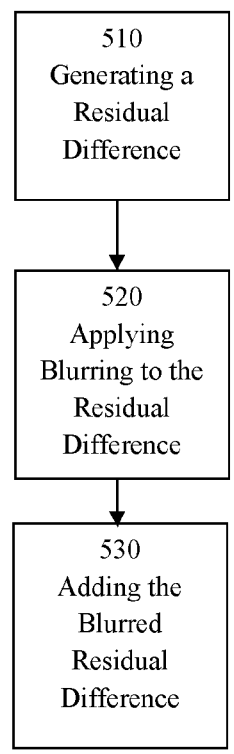
FIG. 5 illustrates a flow diagram for an airbrushing method.
Figure 6:
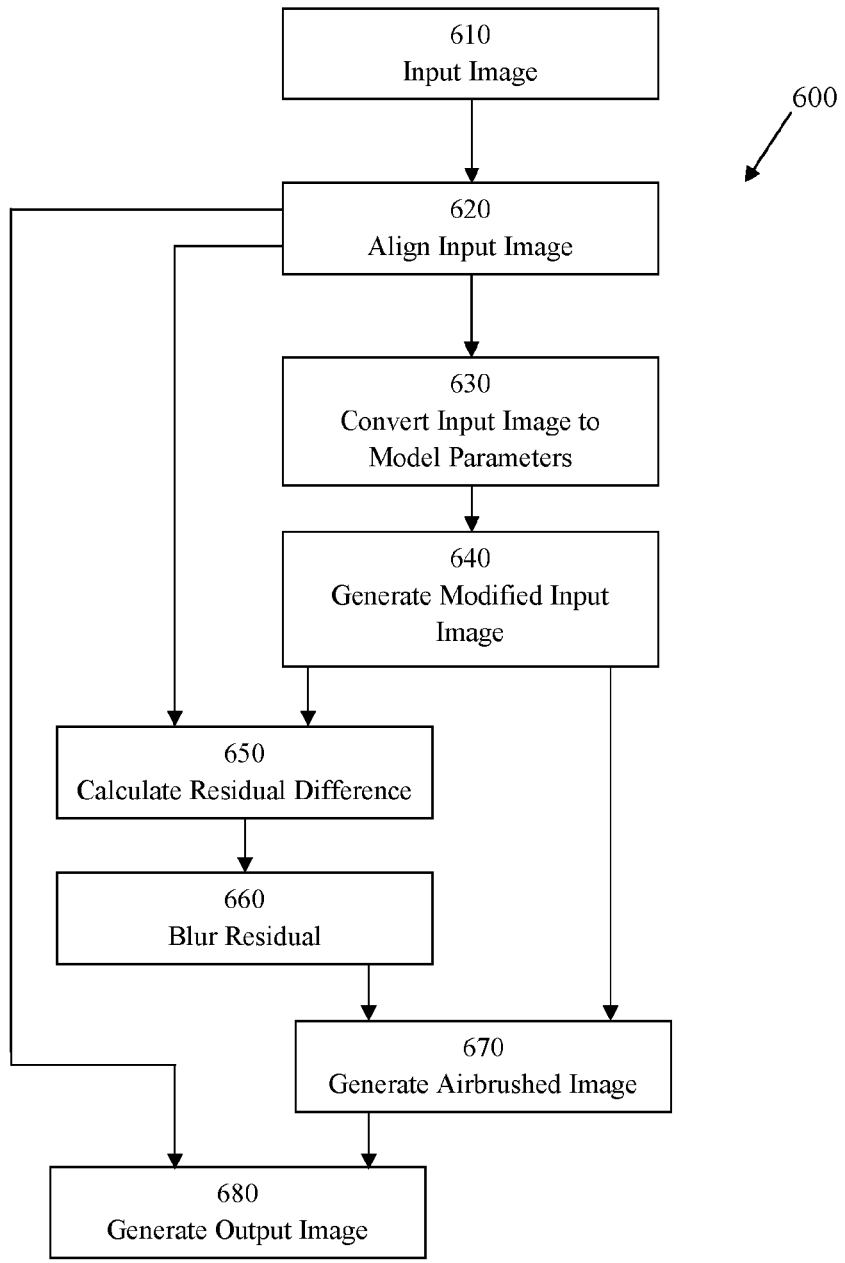
FIG. 6 illustrates a detailed flow diagram for an airbrushing method.

The previous embodiment described a method of manipulating an input image by using a dataset of images in order to generate a manipulated input image with manipulated lighting and/or identity characteristics. The illustrative methods of FIGS. 5 and 6 provide methods by which the small scale characteristics of the input image are manipulated, for example to remove blemishes and spots, which are not addressed during the above-described embodiments. Accordingly, it is possible to use the following embodiment to manipulate the small scale features of the input image and so the following embodiment may be considered to be a technique of airbrushing.

It will therefore, be appreciated that the following embodiment can be used in combination with the previous embodiments to address both the large scale lighting and identity characteristics of the input image as well as the small scale characteristics.

The method of airbrushing may generally be described with reference to FIG. 5 wherein a residual difference is generated at step 510 between the modified input image obtained based upon a dataset of images and the input image. Blurring is then applied to the residual difference in order to generate a blurred residual image; and the blurred residual image is added to the modified input image to generate an airbrushed image. This process is described in further detail below.

The airbrushing process 600 described in FIG. 6 can be considered to be a high-frequency filter. When the method of FIG. 6 is applied to an image of a human face, the image produced as a result may appear to be airbrushed, such that uncommon high frequency changes on the surface of the image, such as a face are smoothed. For example, characteristics such as blemishes or scars are smoothed.

The method of FIG. 6 comprises steps of generating a distribution of model parameters which is described in respect of steps 310, 320, and 330 of FIG. 3 and therefore these steps are omitted from FIG. 6 for the purposes of clarity. These steps are substantially the same as described above in respect of the embodiment of FIG. 3.

The input image 610 is subjected to an alignment process 620 and optionally may be subjected to a weighting process. The alignment and weighting processes of FIG. 6 are substantially the same as those described in respect of step 350 of FIG. 3 and may be substantially the same as the process used to determine the distribution of model parameters in FIG. 6 (not shown). Once aligned and weighted, the input image 610 is converted into model parameters at step 630. The process of converting the input image into model parameters 630 is substantially the same process as described in respect of the embodiment of FIG. 3 and the model parameters of the aligned input image are thus PCA parameters.

The PCA parameters representing the input image which are generated at step 630 are used to generate a modified input image at step 640 in a similar manner to that in step 360 of FIG. 3. In step 650 of FIG. 6, an image residual is determined by calculating the difference between the aligned image 620 and the manipulated input image 640. The residual difference is determined using the pixel-wise operation of Equation 4:

Image Residual Difference=Manipulated Input Image−Aligned Input Image         Equation 4

The image residual difference 650 represents the difference between the manipulated input image generated from the conversion of the input image into PCA parameters in step 630 and the originally aligned image obtained at step 620. Put another way, the uncommon lighting and/or identity information not retained during the fitting process 630 is identified as the residual difference.

The image residual generated at step 650 is representative of the input image characteristics which are not common to the dataset of images, for example where the image is a face—unique marks or blemishes such as marks on the face and also uncommon lighting or identity characteristics. Since the uncommon information represented by the image residual may include high frequency components which are likely to be undesirable, a process of residual blurring 660 is applied to the residual difference 650 in order to reduce the impact of high frequency components of the residual difference 650.

The result of the blurring process of step 660 is a blurred residual image 660 in which the impact of the high frequency elements have been lessened. Thus, the characteristics of the input image 610 which were lost during the step of converting the input image into model parameters 630 are blurred in order to lessen their high frequency components. The resultant blurred residual image is then added back in to the modified input image generated at step 640 to generate an airbrushed image which combines the modified input image 640 with the elements of the image which were not retained during said modified input image generation 640. The result of this combination is obtained at step 670, and the calculation for which is defined below in Equation 5.

Airbrushed Image=Modified Input Image+Blurred Residual Difference         Equation 5

An additional step may be included that adds back in further aspects of the original input image to the airbrushed image, based upon the contrast between the input image and the airbrushed image. Put another way, by adding the original input image and the airbrushed image, the images are blended with one another. The degree to which the original input image is added back into the airbrushed image is controlled by a parameter δ which indicates how close in brightness they must be and scale which scales down the effect for changes which are of a large contrast. An example algorithm for performing this additional step is illustrated below:

change=Airbrushed Image$_i$−Aligned Input Image$_i$ if(change>δ),change=δ+(change−δ)/scale if(change<−δ),change=−δ+(change+δ)/scale Airbrushed Image$_i$=Input Image$_i$+change Where the above algorithm is performed for each value of i from 1 to v, where i is the index of RGB values of the pixels in the image and v is the total number of RGB values of all the pixels in the image.

The airbrushed image 670 is then combined with the aligned input image 620 at step 680 in order to generate the output image. The images obtained at steps 670 and 620 are combined in such a way that the degree to which the image is airbrushed is controllable by the user. For example, the control may be provided by a user interface element, such as a slider bar or button. The user interface element allows the user to select values which indicate the extent to which the "airbrushing" technique is applied to the input image 620. This is done by providing a ratio multiplier to each of the images 670 and 620 as shown in Equation 6 below:

Output=($R_1$*Airbrushed Image)+($R_2$*Aligned Input Image)  Equation 6

Where $R_1+R_2=1$.

By changing the values $R_1$ and $R_2$, it is possible to alter the contributions made by the two images 320, 370 to the output image 380 and thus alter the degree to which the process of FIG. 6 is applied.

For example, where $R_1=1$ and $R_2=0$, the contribution made by the airbrushing is applied to its fullest extent and the aligned input image 620 does not contribute to output. In another example, where $R_1=0$ and $R_2=1$, the airbrushing technique is not applied at all and the output image 680 is identical to the aligned input image 620. In another example, where $R_1=0.5$ and $R_2=0.5$, the contributions to the output image 680 from each of the airbrushed image 670 and the aligned input image 620 is equal.

By providing this degree of control, the user is able to control the airbrushing process 600 by controlling the degree to which the airbrushing method of FIG. 6 is applied to the aligned input image 620.

At some point it is necessary to remove the effects of the alignment process performed at step 620 in order to return the image to its original orientation. This is done by reversing the warping that was applied at step 620 to return the output image to the original orientation of the input image prior to alignment. The lighting and identity characteristic changes, as well as the airbrushing changes to the input image which occur during the airbrushing steps, are retained and are warped back to the original orientation. This could be done at any point with a trade-off between memory consumption and exact image fidelity.

In other embodiments, it will be appreciated that the steps 610, 620, 630, and 640 of FIG. 6 can be replaced so that the manipulated input image obtained by the process of the previous embodiment of FIG. 3 can be used in their place for the purposes of calculating the residual difference and the airbrushed image, i.e. without the need to generate a distribution of model parameters. For example, the system may already be supplied with the modified input image(s).

It will be appreciated by the skilled person that the steps 610, 620, 630, and 640 of FIG. 3 reflect the steps 340, 350, 360, and 370 of FIG. 3 and thus may be performed in substantially the same manner as described in respect of those steps.

In other embodiments, blurring performed in the above-described embodiment may be performed using one of a number of different blurring techniques, for example Gaussian blurring, linear blurring, block blurring, or other techniques involving convolution.

Large Scale Manipulation

Some of the previously described embodiments, specifically the embodiments of FIGS. 1 and 3, use a distribution of model parameters of an input image and also convert the input image into model parameters. It is possible to further enhance the manipulation performed in these embodiments by scaling the model parameters (e.g. the PCA parameters) of the input image. The process of scaling the model parameters of the input image is described below and may be used in combination with the previously described embodiments. For example, the modified input image used in the airbrushing process of FIG. 6 may be generated using the method of the following embodiment.

The reason for scaling the PCA parameters is that higher order modes, e.g. the first, second, third, and fourth modes of the PCA parameters, represent the highest variance in the data and, from observation, generally encode gross lighting changes in the original image dataset 310. Where the images are each representative of a person's face, the lighting changes across the dataset are typically encoded by these higher order modes.

In contrast, the latter modes of the PCA parameters, typically encode less common elements of the dataset of two-dimensional digital images, such as characteristics that are individual to a single image in the dataset of images. As such, when an input face is converted into model parameters, i.e. is represented in terms of modes and a mean value, it is desirable to scale down the latter modes by a greater degree than the initial modes. By doing this, the lighting within the image is substantially retained intact whilst the features of the images encoded by the lower order modes, i.e. the less common characteristics, may be more substantially reduced by the scaling so as to lessen the impact of such features in the generated image.

Figure 7:
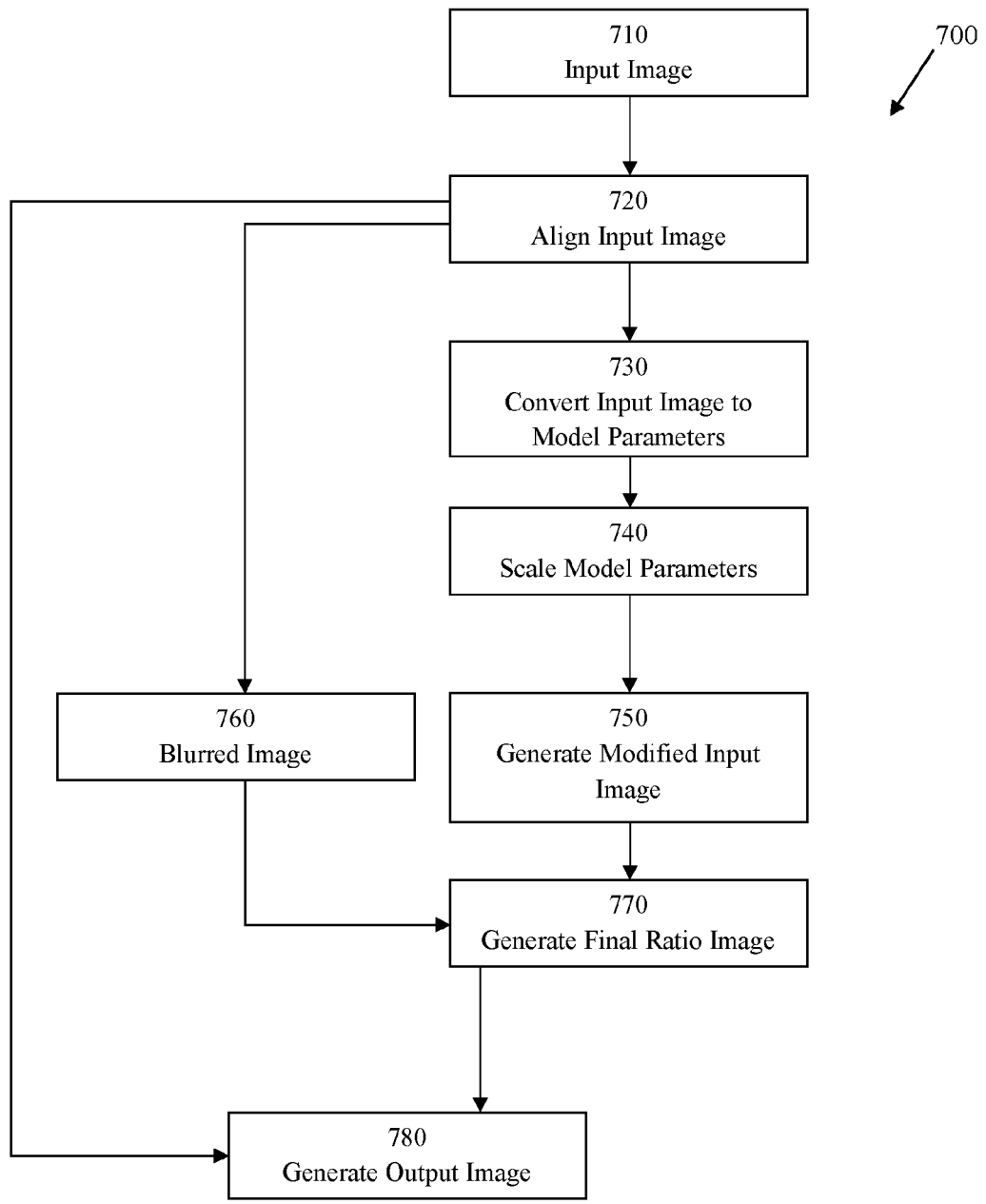
FIG. 7 illustrates a flow diagram of a large-scale correction method.

FIG. 7 illustrates a method of manipulating the distribution of model parameters to additionally manipulate the lighting and/or identity characteristics of an input image.

The steps of 710 to 730 correspond to the steps 610 to 630 of FIG. 6 so that, for a particular input image, the result of step 730 is the conversion of the input image into a set of model parameters, i.e. PCA parameters. In step 740 of FIG. 7, a process of scaling is applied to the PCA parameters of the input image 710. In this embodiment, the PCA parameters of the input image 630 may be scaled by an amount which is inversely proportional to their mode number.

Figure 8:
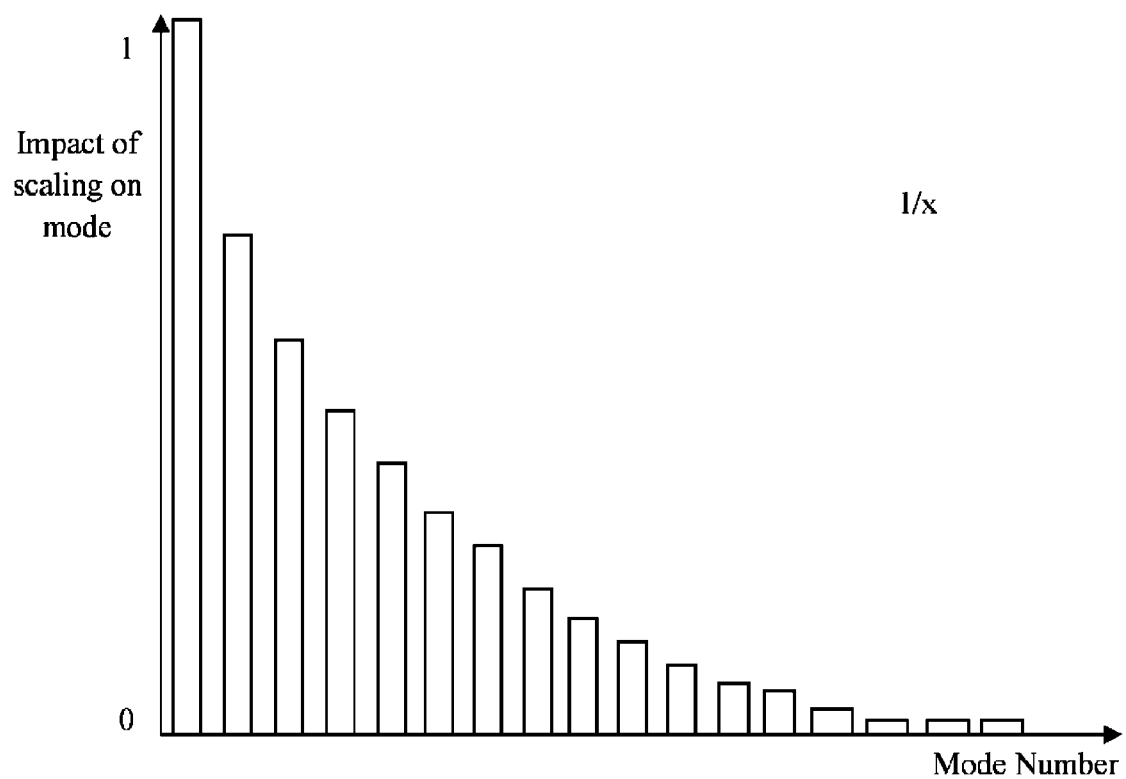
FIG. 8 illustrates an illustrative scaling function used in the method of FIG. 7.

An illustrative scaling factor is illustrated in FIG. 8, whereby the values of the higher order modes for the parameters of the input image are less significantly reduced by the scaling process, and the values of the lower order modes are more significantly reduced.

In a similar manner to the method of FIG. 6, it is also possible to enable a user to control the degree to which the scaling is applied to the PCA parameters. The user may be provided with a user interface element, such as a slider bar or button, which provides the user with the ability to adjust the degree to which the scaling is applied to the PCA parameters.

For example, it is possible to use the following Equation to scale modes by an amount inversely proportional to their mode number:

$$\text{altered mode parameter} = \frac{\text{mode parameter}}{(1 + K * \text{mode parameter})} \quad \text{Equation 7}$$

When the constant of inverse proportionality (K) is large, the mode parameters get scaled down a lot but when K is 0, then the mode parameters are untouched. For example, the user interface element is configured so that the value of K is under the control of the user.

Scaling the model parameters of the input image refers to scaling the model parameters towards the mean value of the distribution of model parameters in the dataset of images. In this way, the model parameters of the input image are brought towards the average qualities of the more common lighting and/or identity characteristics of the images in the dataset. For example, the input image may be manipulated by this scaling to manipulate an input image of a face to appear more like a common face. Since the distribution can be considered to be a probability distribution of a characteristics of a face, the closer the characteristics of a given face are to the mean, the more likely the features of the given face are to appear in the dataset. By performing this, the lighting and/or identity characteristics of the input image that are uncommon to the dataset are reduced.

Having performed step 740, the process of FIG. 7 proceeds to step 750 in which the manipulated input image 750 is generated. The generation of the manipulated input image in step 750 is substantially the same as the process performed at step 640 of FIG. 6, but differs in that in step 750 the calculation is not applied to the original PCA parameters of the input image but, rather, the modified scaled PCA parameters of the input image, i.e. those which have undergone scaling. The resultant image is obtained by the following calculation of Equation 8:

Manipulated Input Image=(Scaled PCA Parameters*$M$)+Mean Image    Equation 8

This calculation of Equation 8 corresponds to the calculation performed in Equation 3 and differs in that it is applied to the scaled PCA parameters rather than the PCA parameters without scaling applied.

The manipulated input image 750 is then used to generate a final ratio image in step 770. The final ratio image 770 is calculated using the manipulated input image generated at step 750 and a blurred representation of the aligned input image obtained at step 720. The blurring is performed in order to preserve fine details in the input image. If blurring was not performed, then steps 760, 770 and 780 would replace the input image with the manipulated image, which does not contain the fine details of the input image. The blurring of the aligned input image performed in step 760 may be done using one of a number of known blurring techniques such as Gaussian blurring.

The blurred image 760 and the manipulated input image 750 are then processed in order to determine the final ratio image 770 using the following calculation:

$$\text{Final Ratio Image} = \frac{\text{Manipulated Input Image}}{\text{Blurred Image}}  \quad \text{Equation 9}$$

The final ratio image 770 is multiplied by the aligned input image in order to generate the output image in step 780. The output image is representative of the input image but is manipulated by scaling the value of the higher numbered modes of the image.

The image generated at the result is processed at step 770 in order to remove the effects of the alignment process performed at step 720. Such a process reverses the warping in a similar manner to that described in step 690.

It will be appreciated that, since the above-described embodiment is an enhancement of the previously described embodiments, corresponding steps of the previously described embodiments are used and are omitted above for clarity.

In other embodiments, it will be appreciated that scaling factors other than the above-described scaling factor of FIG. 8 may be employed. The selection of a suitable scaling factor is within the capability of the skilled person.

In other embodiments, the blurring may be performed in the manner described in respect of FIG. 6. In such embodiments, the blurred image generated in step 760 of FIG. 7 may be the same as the airbrushed image generated at step 670 of FIG. 6.

Scoring Adjustment

Figure 9:
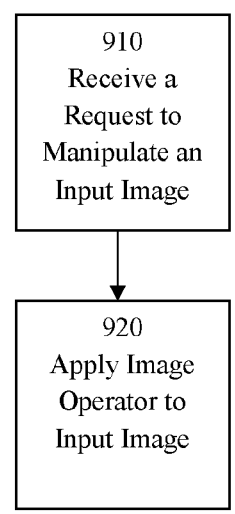
FIG. 9 illustrates a flow diagram of a scoring adjustment method.

The previously described embodiments of FIGS. 4, 6, and 7 describe methods of manipulating the lighting and/or identity characteristics of an input image in order to generate a manipulated or modified input image by using a dataset of images. It is possible to enhance the manipulation of input images by utilising scoring of the dataset of images. This is described in an embodiment laid out below, which may be combined with the above embodiments in order to manipulate the lighting and/or identity characteristics of the input image. FIG. 9 illustrates the method by which a manipulated input image is generated, which comprises receiving a request for the manipulation of an input image 910 and, based upon that request, an image operator is applied to the input image in order to generate the manipulated input image. The method is described in more detail below.

In this embodiment, it is possible to manipulate an input image 340 based upon the process of manually scoring at least two images in the dataset 310 according to a number of pre-selected or pre-determined characteristics of the images. It is possible to individually score each image in the dataset 310 on a number of different perceived characteristics in order to establish a relationship between the scores and the characteristics of the dataset. More specifically, the relationship is represented in the form of a mapping between the scores of the images and the values of the model parameters of the dataset obtained by any of the previously described methods.

The scoring is allocated to images in the dataset based upon such perceived characteristics as perceived beauty, perceived sculptural-ness, and lighting effects such as degree of side lighting, lighting direction and contrast.

The process of scoring the images is performed prior to generation of the model parameters of the dataset. The scoring is performed at system configuration and is performed by human input. The human allocating the scores views an image of the dataset of two-dimensional images and allocates a score for selected characteristics of that image. For example, the scorer may select a score for only some of the characteristics for each image. This is repeated for at least a subset of the image until a set of scores for at least some of the images in the dataset are obtained, as illustrated in the illustrative table below.

TABLE 1

Illustrative scoring for a dataset of four images.

| Image number | Lighting direction | Lighting contrast | Perceived beauty |
|---|---|---|---|
| 1 | −5 | 1 | — |
| 2 | +3 | — | 7 |
| 3 | −4 | 2 | 9 |
| 4 | — | — | — |

In the above example, the scores are allocated to each of image numbers 1 to 4 based upon a specified upper and lower score range. In this example, the scorer elected not to score the perceived beauty of image 1, the lighting contrast of image 2, and elected not to score any characteristics of image 4.

Lighting contrast and perceived beauty may be scored between a value of 0 and 10. Similarly, lighting direction is scored from −10 to 10, where negative numbers are indicative of a left-illuminated image and positive numbers are indicative of a right-illuminated image.

As discussed previously in the previously described embodiments, the model representable as a distribution of model parameters 335 is generated which represents the distribution of the lighting and/or identity characteristics of the dataset of images as extracted or derived from the dataset 310. It is therefore possible to determine a relationship between the scoring values obtained using the above-described scoring procedure and the model parameters 335 obtained by previously described methods. In the illustrative embodiment, the relationship, or a mapping, between the model parameters and the scores is determined by linear regression.

The user is able to request a change in the perceived characteristics of the image, i.e. a change in the values of the scores of an input image. Since the linear regression can be used to determine, for a particular score value, how that score relates to tangible characteristics of the model parameters. Put another way, the mapping represents how the subjective assessments of the images in the dataset 310 relate to actual characteristics of images in a dataset. In this way, it is possible to determine for a particular desired change in scores that is received by a user request, how the model parameters 335 are appropriately adjusted. The user request is therefore in the form of a change in scores, i.e. in the form of a score offset.

Figure 11:
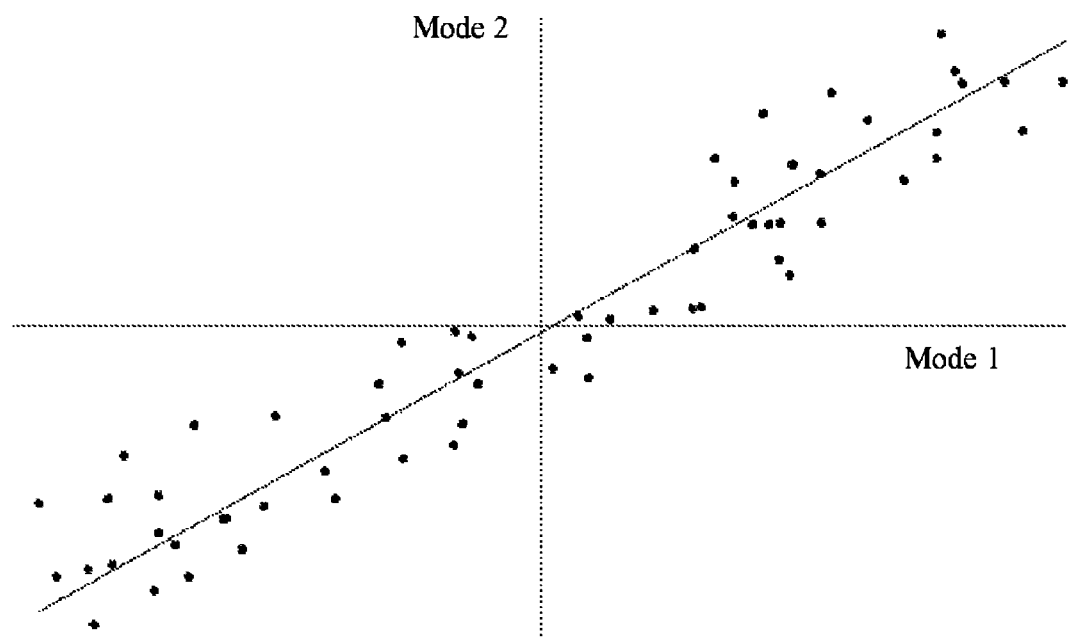
FIG. 11 illustrates a linear regression used in the method of FIG. 10.

For example, it is possible to determine how a request comprising a score offset that increases the scored parameter of "perceived beauty" by 1 will affect the values of the PCA parameters. A typical linear regression is illustrated in FIG. 11, for an example of the score of "lighting contrast".

The user controls the score offset with a number of user interface elements which enable the user to adjust the desired score offset and send a request for the score offset to be applied to the input image. The score offset comprises a combination of all the offsets to more than one perceived characteristic that is changed by the user. For example, the user may request a decrease by 1 of the "lighting contrast" in addition to an increase by 1 of "perceived beauty". In this example, the score offset would comprise both of these offsets. As the user adjusts the score offset, the mapping from the scores to the model parameters is used to determine a summed change in model parameters based upon the score offset. For example, where the characteristics of beauty and sculptural-ness are both offset by +1 by the user, the resultant change in the model parameters for each characteristic are added together to form a summed change in model parameters. In this embodiment, PCA parameters are used and the total change for each PCA parameter is determined from the score offset and the linear regression. The total change in model parameter values may be considered a model parameter offset.

In this illustrative embodiment, the total change for each PCA parameter is clamped to within three standard deviations. Since first and second modes have a greater variance than later modes, the first and second modes are able to be adjusted by a larger amount than the later modes. By placing this restriction, the adjustment is kept within realistic boundaries so as to avoid the image manipulations appearing to be synthetic. This is particularly appropriate for this embodiment, since the input image is that of a face.

In this illustrative embodiment, the changes in the model parameters (i.e., the model parameter offset) which are determined by the score offset of this method are applied to the model parameters of the input image after the input image is converted into model parameters. In other embodiments, the changes in the model parameters determined by the score offset may alternatively be applied to the distribution of PCA parameters of the dataset of images in a manner which enables manipulation of the input image by an amount defined by the score offset. In summary, the score offset may be applied to the model parameters of the input image or the score offset may be applied to the distribution of model parameters of the dataset of images.

Accordingly, there are two different methods of manipulating the input image. The two methods of performing the scoring manipulation of the input image are described below in separate embodiments. A method of performing a scoring adjustment according to an embodiment is described below with reference to FIG. 10.

Figure 10:
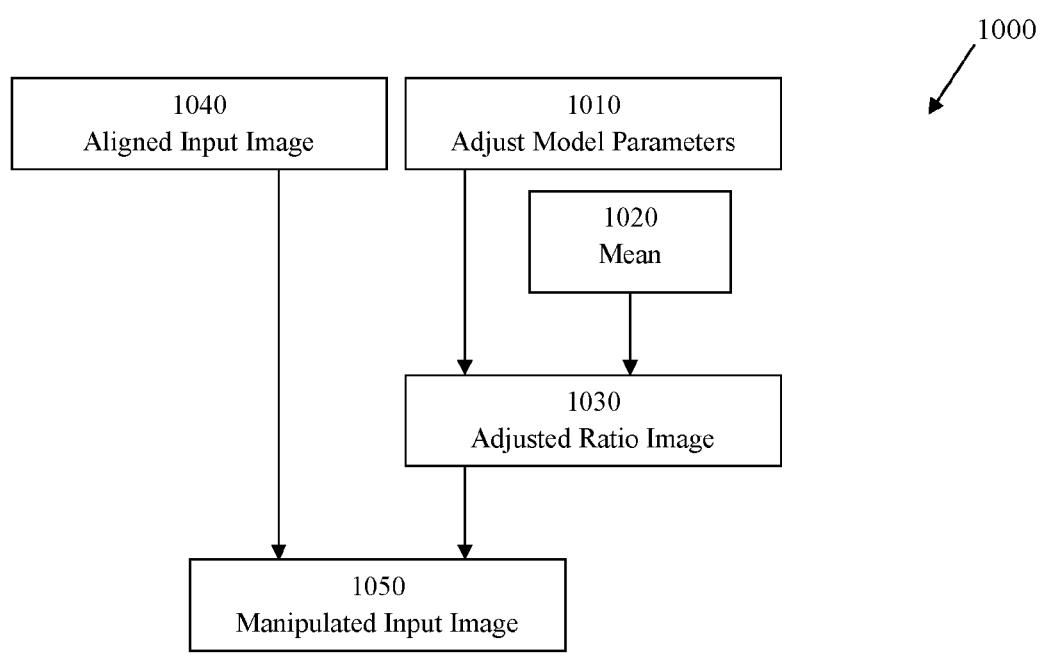
FIG. 10 illustrates a flow diagram for a scoring adjustment method.

A sum of adjusted model parameters is used to determine an adjusted mean image by applying the model parameter changes (or model parameter offset, as it may be termed) to the mean of the distribution of the PCA parameters of the dataset of images in order to determine an adjusted mean face as illustrated in step 1010 of FIG. 10. The adjusted model parameters may effectively be considered a model parameter difference or offset which may be applied. The original mean image obtained during step 330 of FIG. 1 is the mean of the dataset of images, for example the PCA mean.

In step 1030, the change (e.g. the ratio) between the adjusted mean image and the original mean image is determined to generate an adjusted mean ratio image. The calculation for determining the adjusted mean ratio image is provided below in Equation 10:

$$\text{Adjusted Mean Ratio} = \frac{\text{Adjusted Mean}}{\text{Original Mean}} \qquad \text{Equation 10}$$

The resultant adjusted mean ratio 1030 is multiplied by the aligned input image 1040, which is determined in a similar manner to the aligned input image of step 350 of FIG. 1. In this way, the score offset is applied to the aligned input image 340. This calculation is performed in step 1050 according to Equation 11 below to generate a manipulated input image:

$$\text{Manip. Input Image} = \text{Adjusted Ratio Image} * \text{Aligned Input Image} \qquad \text{Equation 11}$$

The manipulated input image determined at step 1050 corresponds to the input image but with manipulated lighting and/or identity characteristics, wherein the degree of manipulation of the lighting and/or identity characteristics correspond to the degree to which the score offset is set to manipulate such characteristics. By generating a score offset, it is possible to utilise the relationship between perceived characteristics of images and their relationship to actual characteristics of images in order to manipulate the lighting and/or identity characteristics of images.

As part of the process of generating the adjusted ratio image 1030, the adjusted ratio image undergoes a process of warping which removes the effects of the alignment process. In this way, the manipulated input image is returned to its original orientation and position.

In this embodiment it is not necessary to generate or manipulate the distribution of model parameters during the processing of the method in order to manipulate the input image. Instead, it is possible to pre-calculate the adjusted ratio image based upon a particular score offset. Then, when manipulation of the input image is requested based upon the particular score offset, the adjusted ratio image can simply be multiplied by the aligned input image in order to generate the manipulated input image. Therefore, it is not necessary to perform any conversion of the input image into model parameters during execution of the method for manipulation. For example, it is possible to pre-generate the adjusted ratio image for all possible score offsets, i.e. all possible score combinations, and pre-store these ratio images.

Accordingly, in this embodiment, the adjusted ratio images which are applied to the input image can be considered to be image operators in that they are applied directly to the input image.

The results of scoring adjustment may optionally be further improved by ensuring that all linear changes which occur as a result of scoring adjustment are orthogonal to one another. For example, the process ensures that a change in lighting does not cause a change in the beauty score or does not adjust the ethnicity of the input image (which is typically ignored for these processes). In order to ensure orthogonality, the Gram-Schmidt method is used. Other techniques for ensuring orthogonality may be employed, such as the Householder transformation or Givens rotation, as would be known to the skilled person. By employing this method, it is possible to control the order in which changes are processed so that the effect of prior changes is removed from the present change but subsequent changes are not considered.

Figure 12:
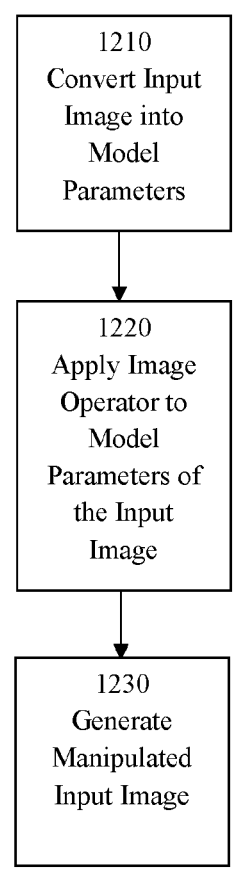
FIG. 12 illustrates a flow diagram for another scoring adjustment method.

According to the alternative embodiment of scoring, illustrated in FIG. 12, adjusted model parameters which represent the model parameter offset generated by the mapping and the score offset, as described above, are applied to the model parameters of the input image in order to manipulate the input image. Accordingly, in this embodiment, the image operator can be considered to be the model parameter offset, representative of the score offset request, which is applied to the model parameters of the input image.

As shown in FIG. 12, the input image is converted into model parameters at step 1210 of FIG. 12 in a similar manner to 360 FIG. 1. The model parameter offset derived from the received score offset may be applied to the model parameters of the input image after step 360 in order to modify the model parameters of the input image to apply the effects of the score offset to the input image. It is then possible to generate a manipulated input image from the resultant combination of the model parameters of the input image and the model parameter offset.

In the above-described scoring embodiments, the scoring is allocated to each image in the dataset 110 or only a subset of the images in the dataset. However, the scoring may only be performed on every other image or a manually selected subset of the images in the dataset. In the above scoring embodiments, for each of the images in the dataset selected for scoring, only some of the possible perceived characteristics may be scored. In other embodiments, this selection may be performed automatically, randomly, or by manual input, either at use or configuration. In some embodiments, this selection may be repeated for at least a subset of the image until a set of scores for at least some of the images in the dataset are obtained.

In some embodiments, the perceived characteristics may comprise at least one of perceived beauty, perceived sculptural-ness, and lighting effects such as degree of side lighting and lighting direction and contrast. It will be appreciated that the perceived characteristics are measured by the judgement of the scorer. As such, the skilled person would be entirely capable of determining which perceived characteristics are to be used.

In some embodiments, the process of scoring the images may be performed prior to generation of the distribution of the model parameters of the dataset. As such, the scoring may be performed at a system configuration and may be performed by human input.

In other embodiments, it will be appreciated that any range of scores and any particular scoring scheme may be selected. The skilled person is entirely capable of determining the particular scoring values and ranges to implement.

In some embodiments, the relationship, or a mapping, between the model parameters and the scores may be determined by linear regression. In other embodiments, other techniques may be employed in order to understand the relationship between two sets of parameters and the skilled person would be capable of implementing such techniques in place of linear regression.

In some embodiments, the user controls the score offset with a number of different user interface elements which enable the user to adjust the desired score offset and send a request for the score offset to be applied to the input image. Each characteristic to be scored may be associated with a separate user interface element which is controllable to adjust the value of the associated scored parameter. In other embodiments, a single user interface element may optionally be used to control the offset of more than one score, for example by combining the results. The score offset request comprises the combination of all of the changes requested by the user, for example a plurality of offsets to different scores. In some embodiments, more than one score offset may be used.

In some embodiments, the total change for each PCA parameter may be clamped to within three standard deviations of the variance of said PCA parameter within the distribution of model parameters. In other embodiments, it will be appreciated that other limits for the clamping may be selected and the selection thereof is well within the capabilities of the skilled person.

As will be appreciated, the scoring methods may be combined with the embodiments previously described such that the scoring process is combined with the previously described model parameter generation and alignment steps.

Lighting Direction and Contrast

The scoring adjustment method described above is suitable for perceived characteristics which are scored. However, some perceived characteristics, for example overall lighting direction and lighting contrast may be processed differently for improved results. Described below is an embodiment in which some perceived characteristics are further processed.

Lighting direction and lighting contrast are intrinsically linked. When changing the contrast of the lighting, it is changing the contrast of the directional lighting that has already been specified. Put another way, the contrast is a modification to the directional light and so they need to be considered together. All other lighting changes described such as side lighting can be considered to be independent of each other (and the orthogonality constraint enforces that) so do not need to be considered in conjunction.

Figure 14:
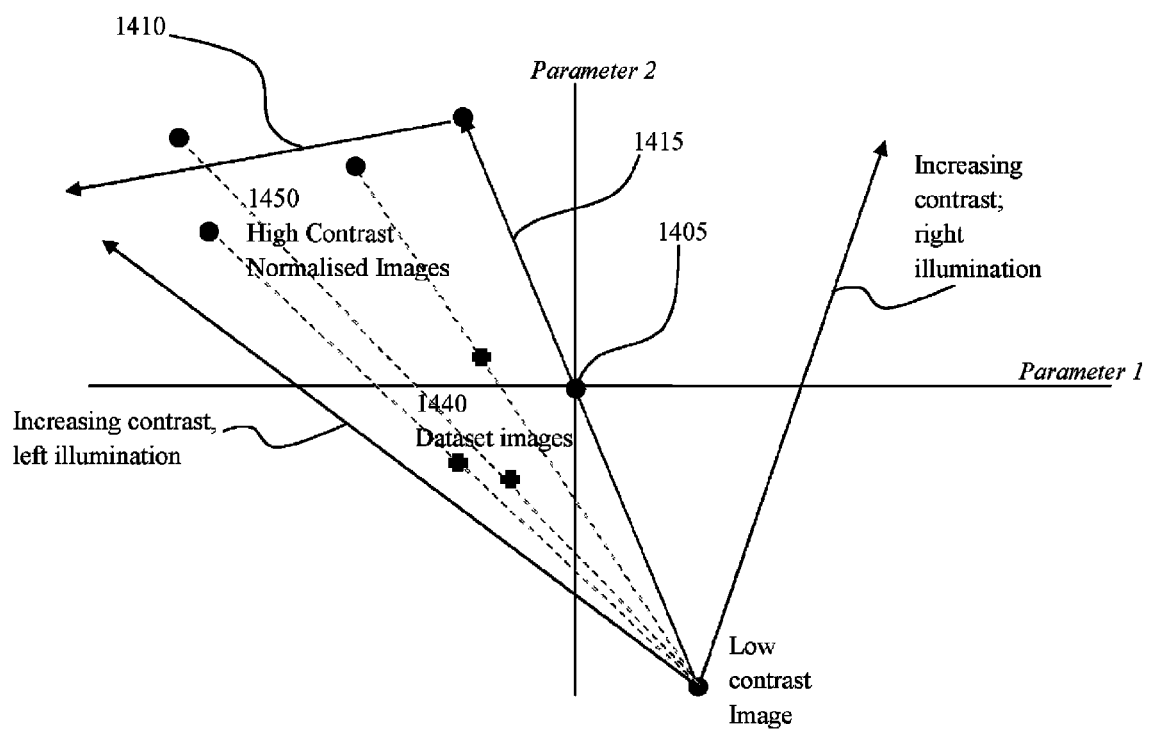
FIG. 14 illustrates an orthogonal adjustment of lighting of an image.

FIG. 14 illustrates a space for an illustrative model, where each axis represents a model parameter, reduced from the large number of parameters for the purposes of clarity. Each point in the space represents a set of model parameter values. Image 1405 represents a mean image as it is located at the origin. Dataset images are shown for left illuminated images only, for the purposes of clarity.

The lighting direction and lighting contrast information is processed to calculate a direction of increasing lighting contrast for images which are illuminated "straight-on" (i.e. neither left nor right illuminated) via linear regression over all the lighting contrast scores, as illustrated in FIG. 14. The direction of increasing contrast for straight-on lighting is illustrated in FIG. 14 as element 1415.

Each of the dataset images 1440 are scaled away from the low contrast image by a distance which is the reciprocal of its lighting contrast normalised between 0 and 1. The resultant images 1450 have then been normalised to high contrast versions of the original image by scaling the images along the dashed lines shown in FIG. 14. A model parameter direction is then determined between the high contrast left illuminated image and the high contrast evenly lit (zero lighting direction; or mean lighting direction) images, as illustrated by element 1410 of FIG. 14.

To calculate a lighting direction and contrast parameter offset, first, a high contrast version of the specified lighting direction is calculated by interpolating along the high contrast lighting direction 1410. The contrast is then reduced by interpolating between the high contrast directional lighting parameters and the low contrast image. So, when the selected contrast of an image is low, any change to the lighting direction is proportionally reduced. Similarly, when the contrast is high, the resultant change in the lighting direction is scaled in proportion with the contrast so that the change in lighting direction is greater.

As with previously described techniques, it is possible for a user to control a user interface element to have control over the degree to which both lighting contrast and lighting direction change.

This embodiment may be combined with the previous scoring techniques in order to generate the manipulated or modified image, as will be appreciated by the skilled person.

Manual Mode Manipulation

The above described embodiments of using scoring to further manipulate an image may be enhanced in another embodiment in which the modes are manually manipulated. This is described in more detail below.

The image operator may be further manipulated in order to provide even more control over the degree to which a score offset maps to an image operator or a change in model parameter values, e.g. the PCA parameter values. For a particular score offset, the change in model parameters represents a linear interpolation to a maximum value of that score, and so that the effect of a score offset may be represented as an image. It is therefore possible to manually adjust that image, for example by using any standard image editing program. The manual adjustments made to the image correspond to a particular score offset and are tweaked to further provide control over the manipulation of the input image, for example by reducing the impact of unwanted side effects of the manipulation.

The manually edited ratio images can be directly applied to an input image through image multiplication. In other embodiments, the manually edited ratio images may be fitted back into the distribution of model parameters in order to constrain the results generated thereby to the model.

Integrated Methods

As will be appreciated, the previously described embodiments illustrated a number of methods which may be used to manipulate the lighting and/or identity characteristics of an input image. It will be appreciated from the foregoing that the methods described herein are related and are suitable for use in combination in a number of different ways.

Described below is an illustrative embodiment for combination of the previously described embodiments in order to manipulate the lighting and/or identity characteristics of an input image.

By combining the three different processes together, it is possible to provide the user with a large amount of control over the manipulation of the input image in a manner which enables the user to combine the effects of the different techniques together to generate the desired manipulated input image.

Figure 13:
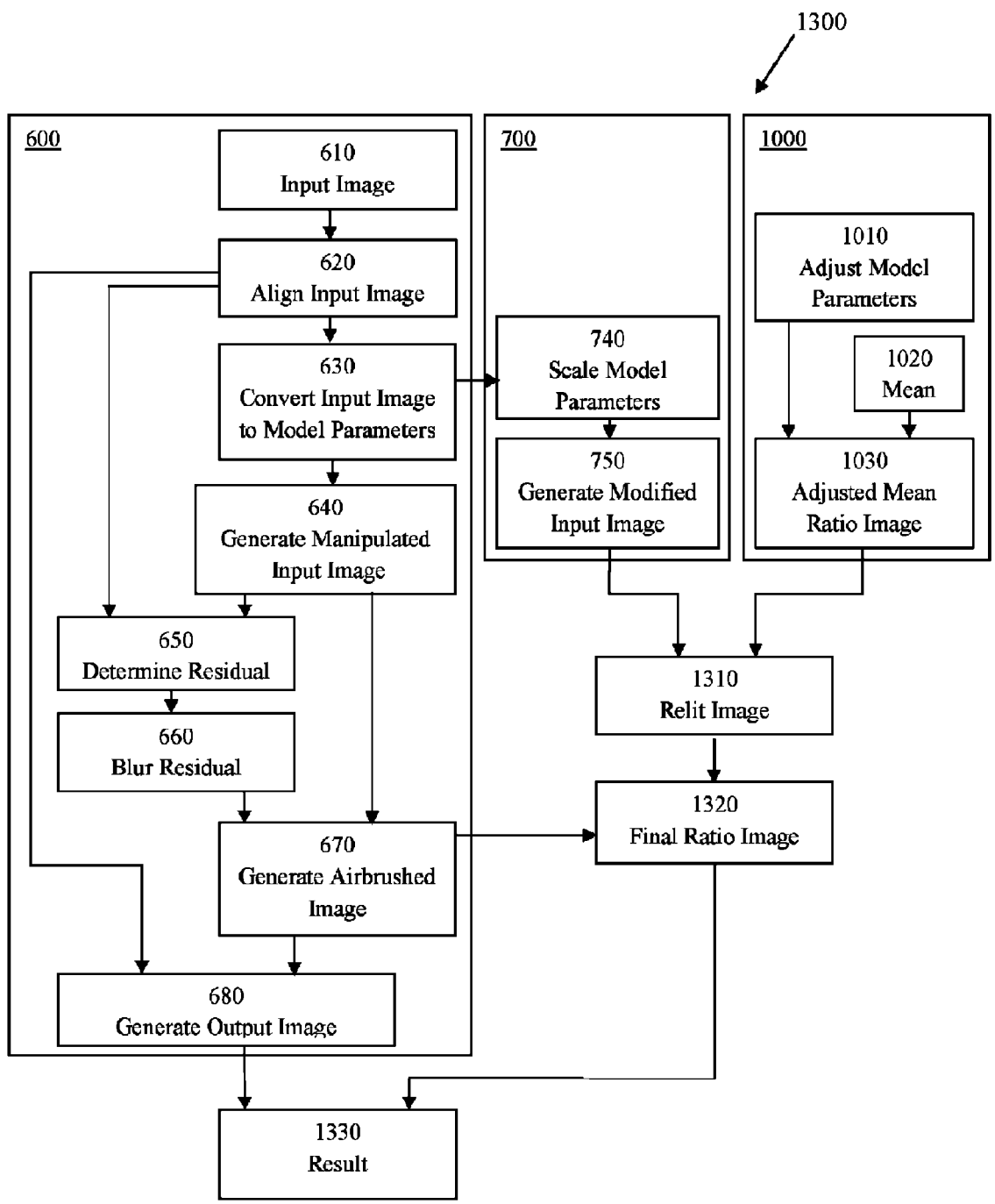
FIG. 13 illustrates an integrated flow diagram of the methods of FIGS. 6, 7, and 10.

The integrated process is illustrated in more detail in FIG. 13, in which the interconnections between the three processes are illustrated in more detail. As shown in FIG. 13, the process includes the airbrushing process 600 illustrated in FIG. 6. The steps of the airbrushing process in FIG. 6 are essentially the same as those illustrated in FIG. 13.

In FIG. 13, the airbrushing process 600 produces two different outputs at steps 670 and 680. The output image is output from step 680, whilst the airbrushed image generated at step 670 is used.

The large scale manipulation process 700 of the embodiment of FIG. 7 is also integrated into the process of the embodiment of FIG. 13. The difference between the process 700 illustrated in the embodiment of FIG. 13 and the corresponding process illustrated in the embodiment of FIG. 7 is that the process of the embodiment of FIG. 7 does not separately generate the distribution of model parameters. Instead, the process 700 in the embodiment of FIG. 13 obtains the model parameters 335 from the process 600 or obtains the parameters from a shared memory.

Similarly, the model parameters of the input image, which are generated in step 630, may be passed or shared between the processes 600 and 700 in the embodiment of FIG. 13 so that it is not necessary for both processes to perform identical steps.

The process 1000 in the embodiment of FIG. 13 is similar to the process 1000 described in the embodiment of FIG. 10, and differs only in the output thereof. In the embodiment of FIG. 10, the output from the process 1000 provides a manipulated input image adjusted output image which is the product of the aligned input image 1040 and the adjusted mean ratio image 1030. However, in the embodiment of FIG. 13, the adjusted mean ratio image 1030 is output. Therefore, instead of multiplying the adjusted ratio image 1030 with the aligned input image 1040 (the output of 620 in FIG. 13), the adjusted mean ratio image 1030 is multiplied with the modified generated image which is generated by the step of 750 shown in FIG. 13. Accordingly, the adjusted mean ratio is applied to the scaled image rather than the aligned input image meaning that the effects of processes 700 and 1000 are combined to additionally enhance the result. This calculation is performed in step 1310 of FIG. 13 and is defined below:

Relit Image=Modified Input Image*Adjusted Mean Ratio Image     Equation 12

A ratio image is determined based upon the ratio between the relit face 1310 and the airbrushed image 670 as part of the airbrushing process 600. The resultant ratio value is referred to as the final ratio image 1320. The final ratio image 1320 is calculated using the following Equation 13:

$$\text{Final Ratio Image} = \frac{\text{Relit Image}}{\text{Airbrushed Image}} \qquad \text{Equation 13}$$

The final ratio image 1320 is then multiplied by the airbrushed image 680 in order to arrive at the result 1330. As with previous methods, as part of step 830, the resultant image 1330 is warped so as to reverse the alignment procedure performed at step 620 and to remove the weighting mask if it was applied.

Examples of characteristics of the images in the dataset which may be scored include perceived beauty, perceived sculptural-ness, lighting direction, lighting intensity, lighting contrast, left side lighting, right side lighting. In addition, any of these aspects can be considered individually for any part of the face or object or collectively for the object as a whole.

In other embodiments, the airbrushing process 600 may be replaced by known airbrushing processes or simple blurring techniques, such as Gaussian blurring, or any type of convolution, bilateral filtering and Fourier based methods.

In another embodiment, a distributed computer system comprising a plurality of server computers and/or user computers are connectable across a network, for example the internet. Each computer typically comprises a processor, memory, and a display. In this embodiment, the methods of the present disclosure may be performed across a number of different server computers and may optionally be performed at different times.

Optionally, the model parameters are not generated each time a new input image is input into the system. Optionally, the model is pre-generated based on an existing set of images. Optionally, the model is adaptively regenerated as new images are added to the dataset.

Although the above embodiments refer to images which are represented as pixels, in some embodiments images may be represented using other schemes, for example vectors. The manipulation of images in such representations using the above-disclosed methods is entirely within the capability of the skilled person.

It will be appreciated that the images described in all of the above embodiments may optionally undergo an image alignment process wherein at least one of the images is warped in order to align the image with other images. Where the input image undergoes an alignment process, the manipulated or modified input image or the resultant image may also undergo a reverse alignment process in order to remove the effects of the warping performed during alignment. In this way, the manipulated or modified input image or the resultant image that has manipulated lighting and/or identity characteristics is returned to the position and/or orientation of the input image. Alternatively, the image operators may undergo an image alignment process wherein any or all of the image operators are warped in order to align them with input image in order to maintain the fidelity of the input image.

Similarly, the images described in all of the above embodiments may optionally undergo a weighting process, either as part of the alignment process, or as a separate process. The weighting process comprises weighting the image, as described previously. Where the model parameters are created from weighted images, the image operators are applied using weights that diminish their effects outside of the important area.

An aspect of the present disclosure includes a computer-readable medium comprising machine instructions which, when executed by a processor, cause the processor to perform any of the above described methods. The computer-readable medium includes a non-transitory computer-readable medium (also can be referred to as a non-transitory processor-readable medium) having computer-executable instructions or computer code thereon for performing various computer-implemented operations. The non-transitory computer-readable medium (or processor-readable medium) is non-transitory in the sense that it does not include transitory propagating signals such as a propagating electromagnetic wave carrying information on a transmission medium.

Further aspects and aspects of the present disclosure are set out below.

According to an aspect of the present disclosure, there is provided a method of manipulating at least one of lighting and identity characteristics of a two-dimensional digital input image, wherein the method uses an image operator representing a change of lighting and/or identity characteristics, the method comprising: applying the image operator to the input image, wherein the input image and the image operator are aligned with respect to each other, to produce a manipulated input image which corresponds to the input image but with manipulated lighting and/or identity characteristics.

Advantageously, by providing the above features, it is possible to manipulate the lighting and/or identity characteristics of an input image in an automated manner, i.e. without significant user input. In so doing, the time taken for the user to generate the manipulated input image is reduced and, beneficially, it is not necessary for the user to have knowledge or skill in image manipulation.

Additionally, by providing these features, it is possible to efficiently manipulate an input image since the processing of the input image and the generation of the output image is data driven. Put another way, it is not necessary to render or model the image in three dimensions in order to manipulate the lighting and/or identity characteristics of the input image.

The input image may be obtained from one of a number of different sources. The input image may be captured by a camera of a mobile communications device, downloaded from a web resource or otherwise captured, obtained, or received.

The lighting characteristics of an image are the characteristics of the image that define the way in which the image is illuminated. The lighting characteristics of an image together describe the overall lighting conditions of the image when the image was captured. The lighting characteristics of an image may include, for example, horizontal and vertical direction of the primary and other lighting sources, kick light direction, and lighting contrast within the image in addition to more specific characteristics such as the locations of where shadows fall upon the image.

The identity characteristics of an image are the characteristics which enable the image subject to be identified. The identity characteristics of an image may also be defined as the characteristics of the image which are unique to the subject of the image. The identity characteristics of an image may include the three-dimensional shape and surface properties of the image. The identity characteristics of an image of a face or body of a human subject may, for example, include any surface properties: such as how light interacts with the skin and the spatially varying depth of the subject with respect to the camera that captured the image. The spatially varying depth affects the angle of the surface at each point in the image. So on a face, for instance, it will affect how sculpted nose or cheeks appear, which can be considered an important aspect of attractiveness.

Each image may be representative of a human subject's face and/or body, such as a digital image or a photograph. However, the present disclosure is not limited to such and the techniques described herein may be applied to images of other subjects, provided that the images used in the process are aligned with respect to one another. The digital images are two-dimensional digital images which may be represented and stored as a two-dimensional array of pixels. For instance, the images may each be represented and stored in terms of the red, green, and blue (RGB) components of each pixel in the array of pixels of that image.

The images may be two dimensional digital images having a low resolution or a high resolution. The images may be low resolution images having a resolution in the order of 200×100 pixels or similar. The actual resolution of the image may vary, as would be appreciated by the skilled person.

Optionally, the method further comprises generating the image operator by: obtaining a first two-dimensional digital image and a second two-dimensional digital image, wherein the first and second images exhibit different lighting and/or identity characteristics and the first image and the second image are aligned with respect to one another; and determining a pixel-wise change between the first image and the second image to generate the image operator.

A pixel-wise change may be considered to be a change in value of each pixel, such as the change in each of an R, a G, and a B value of each pixel, in the first image when compared with the corresponding values in the second image. The pixel-by-pixel difference of the first and second images is representative of the change in lighting and/or identity characteristics exhibited between the first and second images. It is therefore possible to generate an image operator which is representative of the difference in lighting and/or identity characteristics of the first and second images by identifying the change in characteristics. For example, the lighting conditions may differ such that the lighting direction has changed from left to centre and the lighting contrast may have increased from the first to the second image. Therefore, it is possible to generate an image operator which is representative of increased lighting contrast and a change of lighting direction from left to centre. This image operator is then applied to input images to apply such changes in lighting and/or identity characteristics to that input image in order to produce a manipulated input image with increased lighting contrast and a change in lighting source direction.

Optionally, the method further comprises determining the pixel-wise change between the first image and the second image comprises performing at least one of pixel-wise subtraction and pixel-wise division. Optionally, the method further comprises applying the image operator to the input image comprises performing at least one of pixel-wise addition and pixel-wise multiplication.

A pixel-wise change may be determined by pixel-wise operations, such as addition, subtraction, multiplication, and division, or more complex operations, which can be applied on a pixel-by-pixel basis.

It will be appreciated by the skilled person that it is possible to perform the steps of image multiplication, division, addition, and/or subtraction using a number of different operations performed at the same time or performed separately, or alternatively in a single operation. Optionally, it is possible to perform the calculations at different times. For example, the image operator may be generated prior to execution of the method or may be generated during execution of the method.

Optionally, the first image and the second image are images of the same subject.

It will be appreciated that it is not necessary for the first image and the second image to be of the same subject. It is possible to use an image operator which is obtained from images of different subjects and which exhibits different lighting and/or identity characteristics. Where the subjects of the first and second images are different, the image operator may also represent differences in the subjects of the first and second images. This may be desirable or not, depending on the particular application. Therefore, where the first image and the second image are of the same subject, variations in the face due to differences of the identity are removed whilst retaining differences due to variations in the lighting of the images.

Optionally, at least one of the first and second images are aligned with respect to one another. Optionally, at least one of the first image, the second image, and the input image may undergo an alignment process in order to align the images.

Optionally, the images used in the pixel wise change and the alignment process operations are of the same resolution in order for them to operate correctly.

Alternatively, one of the images undergoing a pixel-wise operation may be scaled in order to have the same resolution as the other images. As such, it is assumed that, when performing pixel-wise operations, the dimensions, p, of the images are the same. And when aligning, the dimensions of the aligned image are the same as the image that it is being aligned to.

Since the above operation may be a pixel-wise operation, aligning the images with respect to one another improves the process. This is because it is then possible to process directly corresponding locations on the image. Corresponding features on two images are marked, either manually or automatically, and the first image is manipulated in order to ensure the features are in the same location within the array of pixels. The features that may be marked include, for example, corners of eyes, nose outlines, and mouth shape, in addition to the external periphery of the face. Warping triangular meshes may be one such method for aligning two images.

The above described process of alignment may be applied to all images or a subset of the images to ensure that the images are aligned. Alternatively, the images may be inherently aligned by the way in which the images were captured. For example, the images may be inherently aligned due to the images already having common orientation, position and size characteristics.

Each image may also undergo a weighting process by applying a weighting mask to the image. The weighting mask de-emphasizes aspects of the image and emphasizes others. Where the image is of a face, the weighting mask may de-emphasises areas of the image which are not skin surfaces, for example the hair, the background, the eyes, the inside of the mouth, and the nostrils.

Similarly, the weighting mask may place emphasis upon particular areas of the face, such as the centre of the cheeks and the forehead. Where the images to be weighted are faces, the weighting mask advantageously ensures that the processing is performed solely on the surface of the skin and not upon other extraneous characteristics such as the user's hair or the background of the image. As such, the lighting and/or identity characteristics of the images are manipulated more accurately.

According to another aspect of the present disclosure, there is provided a method of manipulating at least one of lighting and identity characteristics of a two-dimensional digital input image using an image operator, wherein the image operator is based on an association between a dataset of aligned two-dimensional digital images and at least one score allocated to each of a plurality of the images in the dataset, each score representing a lighting and/or identity characteristic of the image, wherein the image operator and the input image are aligned, and wherein the image operator represents a change of lighting and/or identity characteristics, the method comprising: receiving a request to manipulate the lighting and/or identity characteristics of the input image; applying the image operator to the input image to produce a manipulated input image which corresponds to the input image but with manipulated lighting and/or identity characteristics.

According to another aspect of the present disclosure, there is provided a method of manipulating at least one of lighting and identity characteristics of a two-dimensional digital input image using a distribution of model parameters derived from a dataset of aligned two dimensional digital images, wherein the distribution of model parameters represent commonalities of lighting and/or identity characteristics of the dataset, the method comprising: receiving an input image, wherein the input image is aligned to the dataset of images; converting the input image into model parameters to remove the uncommon lighting and/or identity characteristics of the dataset in the input image; modifying the model parameters of the input image by scaling the model parameters to reduce the distance to the distribution of model parameters; using the modified model parameters of the input image to produce a modified input image which corresponds to the input image but with manipulated lighting and/or identity characteristics.

According to another aspect of the present disclosure, there is provided a method of manipulating at least one of lighting and identity characteristics of a two-dimensional digital input image using a distribution of model parameters derived from a dataset of two dimensional digital aligned images, wherein the distribution of model parameters represent commonalities of lighting and/or identity characteristics of the dataset, the method comprising: receiving an input image, wherein the input image is aligned to the dataset of images; converting the input image into model parameters to remove uncommon lighting and/or identity characteristics of the dataset in the input image; and using the model parameters of the input image to produce a modified input image which corresponds to the input image but with manipulated lighting and/or identity characteristics.

The above embodiments have been described by way of example only, and the described embodiments are to be considered in all respects only as illustrative and not restrictive. It will be appreciated that variations of the described embodiments may be made without departing from the scope of the invention which is indicated by the appended claims rather than by the foregoing description.

The invention claimed is:

1. A method of manipulating a two-dimensional digital input image using an image operator that represents a change in a lighting characteristic, wherein the method comprises:
deriving a mapping from an association between characteristics of aligned two-dimensional digital images in a dataset and at least one score allocated to each of a plurality of the images in the dataset, each score representing a degree of the lighting characteristic in the image, and wherein the dataset of images comprises images of different subjects;
calculating the image operator based on a score offset indicative of a desire to manipulate the lighting characteristic in the input image by a particular degree and the derived mapping, wherein the image operator and the input image are aligned;
receiving a request comprising the score offset; and
applying the calculated image operator to the input image based upon the received score offset to produce a manipulated input image which corresponds to the input image but with the lighting characteristic manipulated.

2. The method according to claim 1, wherein the method uses an image operator that represents a change in an identity characteristic, wherein the image operator is calculated based on a score offset indicative of a desire to manipulate the identity characteristic of an input image by a particular degree and a mapping derived from an association between characteristics of the aligned two-dimensional digital images in a dataset and at least one score allocated to each of a plurality of the images in the dataset, each score representing a degree of the identity characteristic in the image, and wherein the image operator and the input image are aligned, the method further comprising:
receiving a request comprising a score offset indicative of a desire to manipulate the identity characteristic in the input image by a particular degree;
applying a calculated image operator to the input image based upon the received score offset to produce a manipulated input image which corresponds to the input image but with the identity characteristic manipulated.

3. The method according to claim 1, wherein the calculating of the image operator comprises;
determining a mean of the dataset;
determining an adjusted mean of the dataset using the mapping and the score offset, and
determining a pixel-wise change between the mean of the dataset and the adjusted mean of the dataset to generate the image operator representing the requested manipulation of the lighting characteristics.

4. The method of claim 3, wherein determining the pixel-wise change comprises at least one of pixel-wise subtraction and pixel-wise division.

5. The method according to claim 3, wherein applying the image operator to the input image comprises at least one of pixel-wise addition and pixel-wise multiplication.

6. The method according to claim 1, further comprising:
deriving a distribution of model parameters from the dataset of images, wherein the model parameters comprise model parameters that represent commonalities of lighting characteristics in the dataset;
converting the input image into model parameters;
applying the image operator to the input image by applying the score offset to the model parameters of the input image based on the mapping to adjust the model parameters of the input image; and
generating the manipulated input image based on the model parameters of the input image.

7. The method according to claim 1, wherein at least one score is user-defined.

8. The method according to claim 1, wherein at least one score comprises at least one of: the direction of the lighting of the image and the lighting contrast of the image.

9. The method according to claim 1, wherein the degree to which each lighting characteristic of the input image is manipulated is limited based upon the standard deviation of model parameters in the dataset.

10. The method according to claim 1, wherein the image operator is represented as an operator control image and wherein the method further comprises manually editing the operator control image.

11. The method according to claim 1, wherein each of the plurality of images in the data set has more than one score, wherein the score offset comprises an offset to more than one score, and wherein the method further comprises applying the effect of each offset so that the effect of each offset is orthogonal to the effects of other offsets.

12. The method according to claim 1, wherein at least one image represents at least one of a face and a body of a human.

13. The method according to claim 1, wherein at least one image undergoes an alignment process to ensure alignment.

14. The method according to claim 13, wherein the alignment process comprises aligning the image to a reference shape.

15. The method according to claim 13, wherein the method further comprises performing a reversed alignment process to remove the effects of the alignment process.

16. The method according to claim 13, wherein the alignment process comprises warping the at least one image.

17. The method according to claim 1, wherein at least one image is weighted according to a weighting mask.

18. A non-transitory computer-readable medium comprising machine instructions which, when executed by a processor, cause the processor to perform the method of claim 1.

19. The method according to claim 1, wherein the request to manipulate the lighting and/or identity characteristics of the input image is represented by a score offset and wherein the image operator is calculated based on a mapping and the at least one score offset, and wherein the mapping is derived from the association between the dataset of aligned two-dimensional digital images and the at least one score allocated to each of a plurality of the images in the dataset.

20. An apparatus comprising:
a computer processor;
a tangible, non-transitory computer-readable medium communicatively coupled to the computer processor and storing instructions that, when executed by the computer processor, cause the computer processor to perform a method of manipulating a two-dimensional digital input image using an image operator that represents a change in a lighting characteristic, the method comprising:

deriving a mapping from an association between characteristics of aligned two-dimensional digital images in a dataset and at least one score allocated to each of a plurality of the images in the dataset, each score representing a degree of the lighting characteristic in the image, and wherein the dataset of images comprises images of different subjects;

calculating the image operator based on a score offset indicative of a desire to manipulate the lighting characteristic in the input image by a particular degree and the derived mapping, wherein the image operator and the input image are aligned;

receiving a request comprising the score offset; and applying the calculated image operator to the input image based upon the received score offset to produce a manipulated input image which corresponds to the input image but with the lighting characteristic manipulated.

* * * * *